United States Patent
Hwang

(10) Patent No.: US 12,395,224 B2
(45) Date of Patent: Aug. 19, 2025

(54) METHOD AND DEVICE FOR PERFORMING UNIDIRECTIONAL TRANSMISSION IN WIRELESS COMMUNICATION SYSTEM

(71) Applicant: LG ELECTRONICS INC., Seoul (KR)

(72) Inventor: Bongjun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 184 days.

(21) Appl. No.: 18/250,626

(22) PCT Filed: Nov. 3, 2021

(86) PCT No.: PCT/KR2021/015785
§ 371 (c)(1),
(2) Date: Apr. 26, 2023

(87) PCT Pub. No.: WO2022/098079
PCT Pub. Date: May 12, 2022

(65) Prior Publication Data
US 2023/0421235 A1  Dec. 28, 2023

(30) Foreign Application Priority Data
Nov. 3, 2020 (KR) .................. 10-2020-0145373

(51) Int. Cl.
*H04B 7/06* (2006.01)
*H04B 7/0408* (2017.01)
*H04B 7/08* (2006.01)

(52) U.S. Cl.
CPC ....... *H04B 7/06952* (2023.05); *H04B 7/0408* (2013.01); *H04B 7/088* (2013.01)

(58) Field of Classification Search
CPC .. H04B 7/0404; H04B 7/0408; H04B 7/0417; H04B 7/0421; H04B 7/0619; H04B 7/0695; H04B 7/06952; H04B 7/088; H04W 4/06
USPC ........ 375/259, 260, 262, 265, 267; 370/328, 370/330, 336, 343, 345; 455/24, 69, 70, 455/500
See application file for complete search history.

(56) References Cited

U.S. PATENT DOCUMENTS

| | | | |
|---|---|---|---|
| 2018/0249496 A1* | 8/2018 | Radulescu | H04B 7/0695 |
| 2020/0045664 A1* | 2/2020 | Choi | H04W 4/40 |
| 2020/0259553 A1* | 8/2020 | Kim | H04W 48/12 |
| 2021/0100059 A1* | 4/2021 | Xu | H04B 7/06954 |
| 2022/0110039 A1* | 4/2022 | Soldati | H04W 28/082 |
| 2022/0216947 A1* | 7/2022 | Kim | H04L 1/1819 |

* cited by examiner

*Primary Examiner* — Young T. Tse
(74) *Attorney, Agent, or Firm* — LEE, HONG, DEGERMAN, KANG & WAIMEY

(57) ABSTRACT

Provided are a method and device for performing groupcast transmission in a wireless communication system. A transmission terminal can transmit, through a plurality of beams, a discovery signal and a message notifying the starting of a groupcast service, and find the best transmission beam for a reception terminal on the basis of which resource the reception terminal uses to transmit feedback to the message. Thereafter, the transmission terminal can transmit data to the reception terminal by using the best transmission beam.

18 Claims, 26 Drawing Sheets

FIG. 7
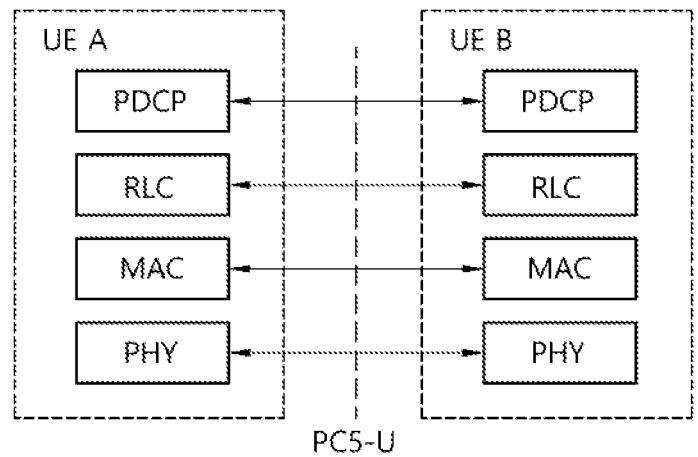
(a)
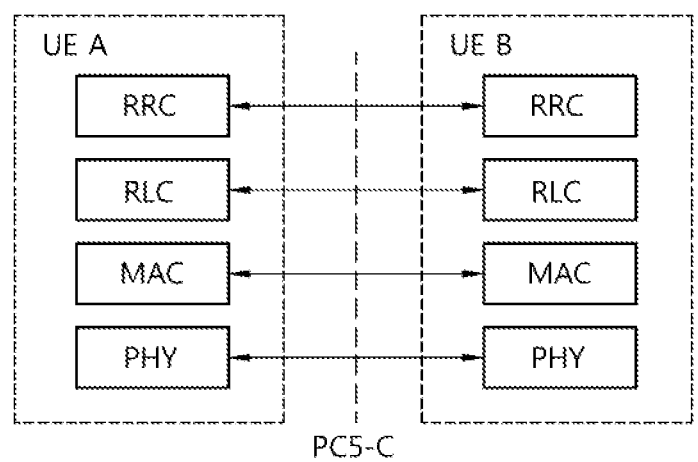
(b)

FIG. 8
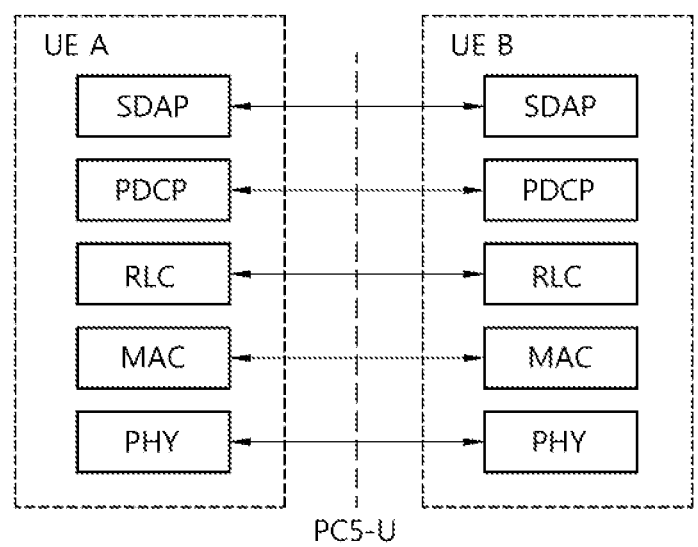
(a)
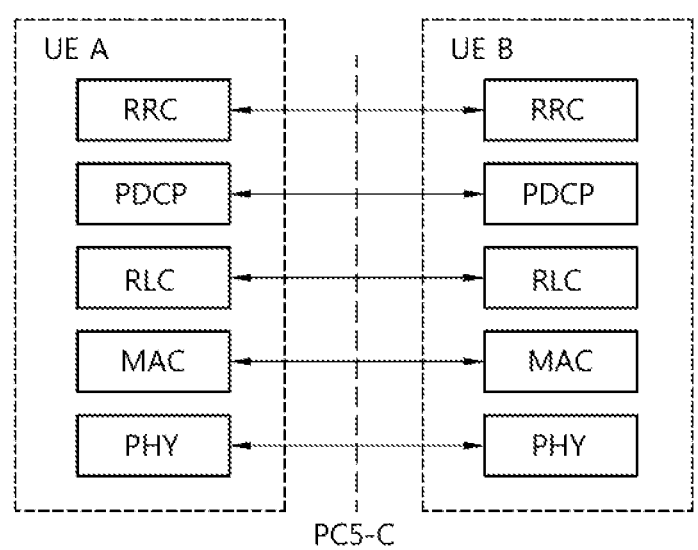
(b)

METHOD AND DEVICE FOR PERFORMING UNIDIRECTIONAL TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2021/015785, filed on Nov. 3, 2021, which claims the benefit of earlier filing date and right of priority to Korean Application No. 10-2020-0145373, filed on Nov. 3, 2020, the contents of which are all hereby incorporated by reference herein in their entireties.

TECHNICAL FIELD

This specification relates to a unidirectional transmission operation in a wireless communication system.

BACKGROUND

Recently, interest in D2D (Device-to-Device) technology for direct communication between devices is increasing. D2D communication can be extended and applied to signal transmission and reception between vehicles, and communication related to vehicles is called vehicle-to-everything (V2X) communication.

The "X" in V2X can be various, such as pedestrian, vehicle, infrastructure/network, etc., which in turn can be labeled as V2P, V2V, V2I/V2N, etc.

V2X communications can also support beam-based transmission. Beamforming techniques, which concentrate signals into narrow transmission angles to overcome the high path losses associated with using high frequency bands such as THz (terahertz), can also be supported for V2X communications.

Sidelink (SL) refers to a direct link between user equipments, and sidelink communication refers to a communication method in which voice or data is directly exchanged between user equipments without passing through a base station. The SL is being considered as a method for solving the burden of the base station due to rapidly increasing data traffic. V2X communication can be performed in sidelink.

Meanwhile, in the sidelink, bidirectional communication between user equipments (UEs) may be performed, and in some cases, unidirectional communication such as groupcast may be performed. Groupcast means sending a message or information to a number of targeted parties (i.e., a group). Unidirectional communication such as groupcast may also be used for V2X communication.

SUMMARY

V2X communication setup between UEs may be performed through the following procedure. That is, UE #1 broadcasts a beam discovery signal to the surroundings in all directions through a directional beam. After receiving the beam discovery signal, UE #2 in the vicinity of UE #1 transmits a random access channel (RACH) in response thereto. Then, UE #1 transmits a RACH response to UE #2. Through this process, V2X communication between UE #1 and UE #2 is set up. This process is a necessary communication setup procedure for bidirectional communication between UE #1 and UE #2, but if unidirectional communication is to be performed between UE #1 and UE #2, RACH transmission and RACH response transmission may be unnecessary procedures, which may cause latency. In addition, when a plurality of vehicles transmit RACH, collision problems and unnecessary interference may occur even if different sequences are used.

It is intended to provide a groupcast transmission method capable of solving this problem and a device using the method.

In order to solve the above problem, according to the implementation of the present specification, RACH transmission and RACH response transmission processes are not required in the setup process for groupcast transmission. That is, the transmitting UE transmits a discovery signal and a message announcing the start of the groupcast service through a plurality of beams (discovery step), and the best transmission beam for the receiving UE can be known based on which resource the receiving UE transmits the feedback on the message. Then, data can be transmitted to the receiving UE using the best transmission beam.

Also, when a problem occurs in a radio link during groupcast communication, the radio link is restored by transmitting a discovery signal using fewer beams than in the discovery step.

This specification may have various effects.

For example, in a process of setting up unidirectional communication between UEs, it is possible to set up communication between the UEs even when the RACH transmission/RACH response transmission process is omitted. Therefore, it is possible to set up communication quickly with less delay compared to the prior art.

For example, when a problem occurs in a radio link during groupcast communication, resource efficiency increases because the radio link can be restored using relatively few resources.

The effects of the specific examples in this specification are not limited to those listed above. For example, there may be various technical effects that a person having ordinary skill in the relevant art would understand or infer from the present disclosure. Accordingly, the specific effects of the disclosure are not limited to those expressly set forth herein, but may include various effects that may be understood or inferred from the technical features of the disclosure.

BRIEF DESCRIPTION OF THE DRAWINGS

FIG. 7 illustrates a radio protocol architecture for SL communication according to an embodiment of the present disclosure.

FIG. 8 illustrates a radio protocol architecture for SL communication according to an embodiment of the present disclosure.

DETAILED DESCRIPTION

In this specification, "A or B" may mean "only A", "only B", or "both A and B". In other words, "A or B" herein may be interpreted as "A and/or B". For example, "A, B or C" herein means "only A", "only B", "only C", or "any and any combination of A, B and C".

As used herein, a slash (/) or a comma (comma) may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, in this specification, the expression "at least one of A or B" or "at least one of A and/or B" means "at least one of A and B".

Also, as used herein, "at least one of A, B and C" means "only A", "only B", "only C", or "any combination of A, B and C". In addition, "at least one of A, B or C" or "at least one of A, B and/or C" means can mean "at least one of A, B and C".

In addition, parentheses used herein may mean "for example". Specifically, when displayed as "control information (PDCCH)", "PDCCH" may be proposed as an example of "control information". In other words, "control information" in the present specification is not limited to "PDCCH", and "PDCCH" may be proposed as an example of "control information". In addition, even when displayed as "control information (i.e., PDCCH)", "PDCCH" may be proposed as an example of "control information".

Technical features that are individually described in one drawing in this specification may be implemented individually or may be implemented at the same time.

Hereinafter, new radio access technology (new RAT, NR) will be described.

As more and more communication devices require more communication capacity, there is a need for improved mobile broadband communication over conventional radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

Figure 1:
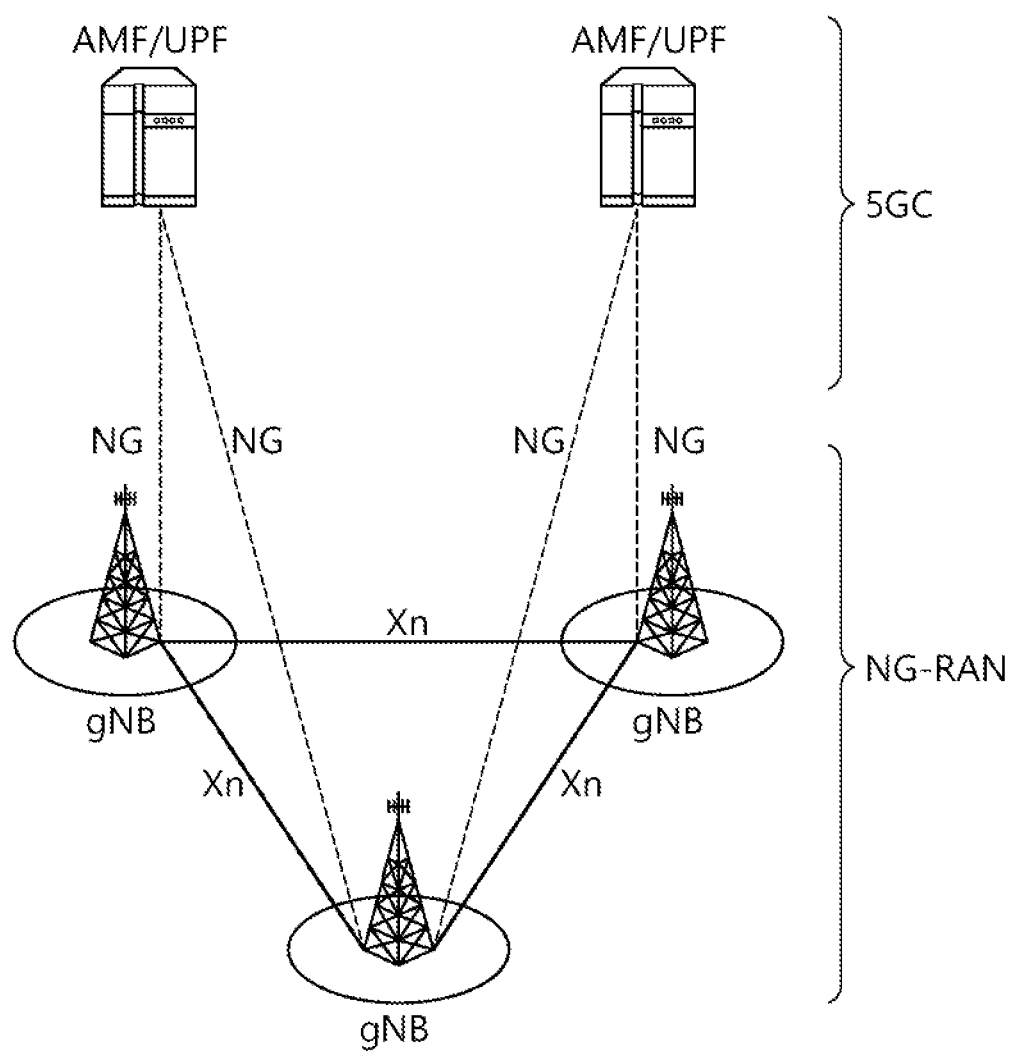
FIG. 1 illustrates a system structure of a New Generation Radio Access Network (NG-RAN) to which NR is applied.

FIG. 1 illustrates a system structure of a next generation radio access network (NG-RAN) to which NR is applied.

Referring to FIG. 1, the NG-RAN may include a gNB and/or an eNB that provides user plane and control plane protocol termination to a UE. FIG. 1 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

NR supports multiple numerology or, subcarrier spacing (SCS) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the wireless communication technology implemented in the wireless device of the present specification may include narrowband IoT (NB-IoT) for low-power communication as well as LTE, NR, and 6 G. For example, the NB-IoT technology may be an example of a LPWAN (Low Power Wide Area Network) technology, and may be implemented in standards such as LTE Cat NB1 and/or LTE Cat NB2, and is not limited to the above-mentioned name. Additionally or alternatively, the wireless communication technology implemented in the wireless device of the present specification may perform communication based on LTE-M technology. For example, the LTE-M technology may be an example of an LPWAN technology, and may be called by various names such as enhanced MTC (eMTC). For example, LTE-M technology may be implemented in at least one of various standards such as 1) LTE CAT 0, 2) LTE Cat M1, 3) LTE Cat M2, 4) LTE non-BL (Non-Bandwidth Limited), 5) LTE-MTC, 6) LTE MTC, and/or 7) LTE M, and is not limited to the above-described name. Additionally or alternatively, the wireless communication technology implemented in the wireless device of the present specification may include at least one of ZigBee, Bluetooth, and/or LPWAN in consideration of low-power communication, and it is not limited to the above-mentioned names. For example, the ZigBee technology may create PANs (Personal Area Networks) related to small/low-power digital communication based on various standards such as IEEE 802.15.4, and may be called by various names.

<6G System General>

6G (wireless communication) system is aimed at (i) very high data rate per device (apparatus), (ii) very large number of connected devices, (iii) global connectivity, (iv) very low latency, (v) lowering energy consumption of battery-free IoT devices, (vi) ultra-reliable connectivity, and (vii) connected intelligence with machine learning capabilities. The vision of the 6G system can be four aspects such as intelligent connectivity, deep connectivity, holographic connectivity, and ubiquitous connectivity, and the 6G system can satisfy the requirements shown in Table 3 below. That is, Table 3 is a table showing an example of requirements for a 6G system.

TABLE 3

| Per device peak data rate | 1 Tbps |
| --- | --- |
| E2E latency | 1 ms |
| Maximum spectral efficiency | 100 bps/Hz |
| Mobility support | Up to 1000 km/hr |
| Satellite integration | Fully |
| Artificial Intelligence (AI) | Fully |
| Autonomous vehicle | Fully |
| extended Reality (XR) | Fully |
| Haptic Communication | Fully |

The 6G system can have key factors such as enhanced mobile broadband (eMBB), ultra-reliable low latency communications (URLLC), massive machine-type communication (mMTC), AI integrated communication, tactile internet, high throughput, high network capacity, high energy efficiency, low backhaul and access network congestion, and enhanced data security.

Figure 2:
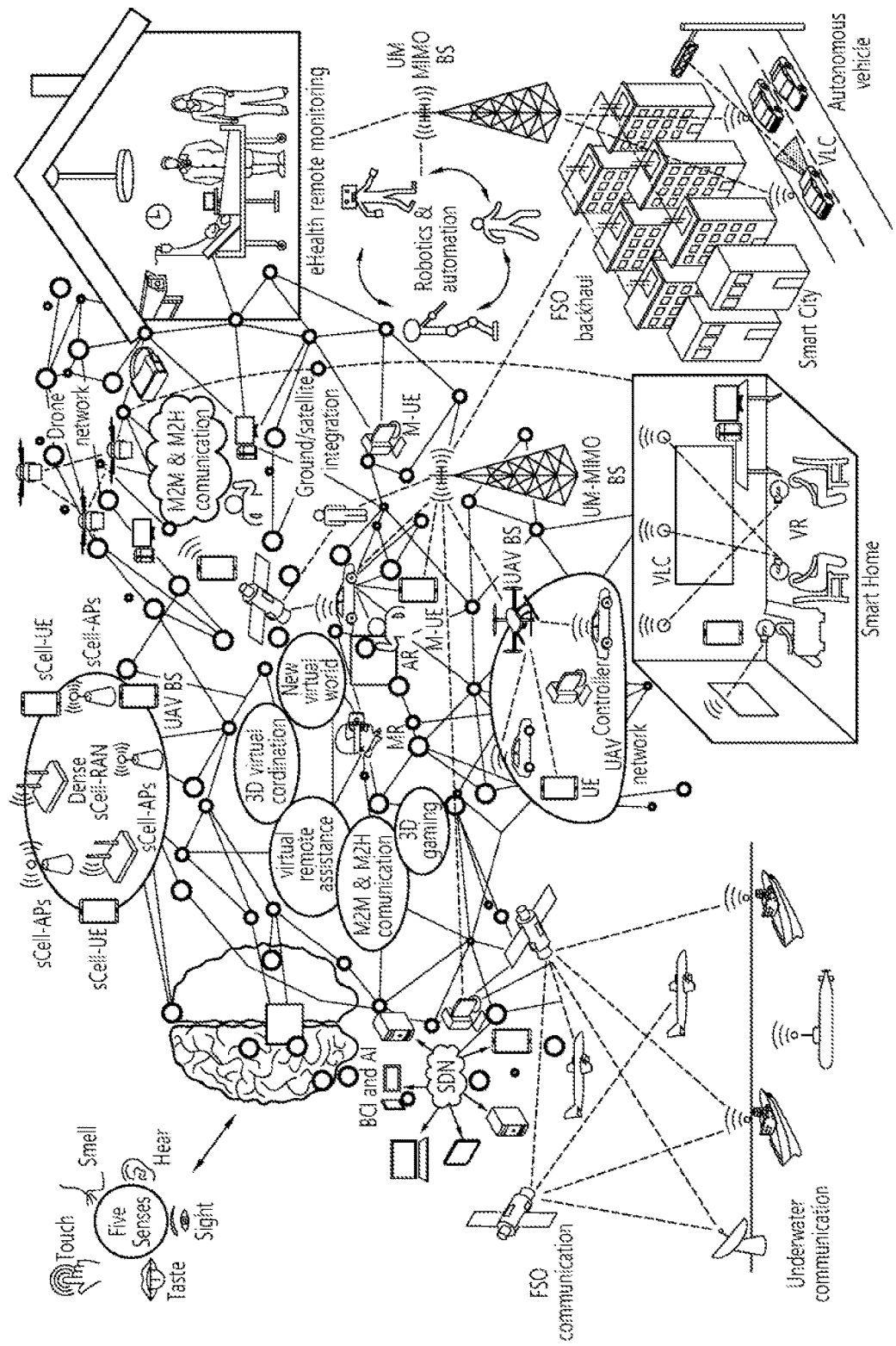
FIG. 2 is a diagram showing an example of a communication structure that can be provided in a 6G system.

FIG. 2 is a diagram showing an example of a communication structure that can be provided in a 6G system.

6G systems are expected to have 50 times higher simultaneous radiocommunication connectivity than 5G radiocommunication systems. URLLC, a key feature of 5G, will become even more important in 6G communications by providing end-to-end latency of less than 1 ms. The 6G system will have much better volume spectral efficiency as opposed to the frequently used area spectral efficiency. 6G systems can provide very long battery life and advanced battery technology for energy harvesting, so mobile devices will not need to be charged separately in 6G systems. New network characteristics in 6G may be as follows.

Satellites integrated network: 6G is expected to be integrated with satellites to serve the global mobile population. Integration of terrestrial, satellite and public networks into one wireless communication system is critical for 6G.

Connected intelligence: Unlike previous generations of wireless communications systems, 6G is revolutionary and will update the wireless evolution from "connected things" to "connected intelligence." AI can be applied at each step of a communication procedure (or each procedure of signal processing to be described later).

Seamless integration wireless information and energy transfer: 6G wireless networks will transfer power to charge the batteries of devices such as smartphones and sensors. Therefore, wireless information and energy transfer (WIET) will be integrated.

Ubiquitous super 3D connectivity: Access to networks and core network capabilities of drones and very low Earth orbit satellites will make super 3D connectivity in 6G ubiquitous.

In the new network characteristics of 6G as above, some general requirements can be as follows.

Small cell networks: The idea of small cell networks has been introduced to improve the received signal quality resulting in improved throughput, energy efficiency and spectral efficiency in cellular systems. As a result, small cell networks are an essential feature of 5G and Beyond 5G (5 GB) and beyond communication systems. Therefore, the 6G communication system also adopts the characteristics of the small cell network.

Ultra-dense heterogeneous networks: Ultra-dense heterogeneous networks will be another important feature of 6G communication systems. Multi-tier networks composed of heterogeneous networks improve overall QoS and reduce costs.

High-capacity backhaul: A backhaul connection is characterized by a high-capacity backhaul network to support high-capacity traffic. High-speed fiber and free space optical (FSO) systems may be possible solutions to this problem.

Radar technology integrated with mobile technology: High-precision localization (or location-based service) through communication is one of the features of 6G wireless communication systems. Thus, radar systems will be integrated with 6G networks.

Softwarization and virtualization: Softwarization and virtualization are two important features fundamental to the design process in 5 GB networks to ensure flexibility, reconfigurability and programmability. In addition, billions of devices can be shared in a shared physical infrastructure.

<THz (Terahertz) Communication>

Figure 3:
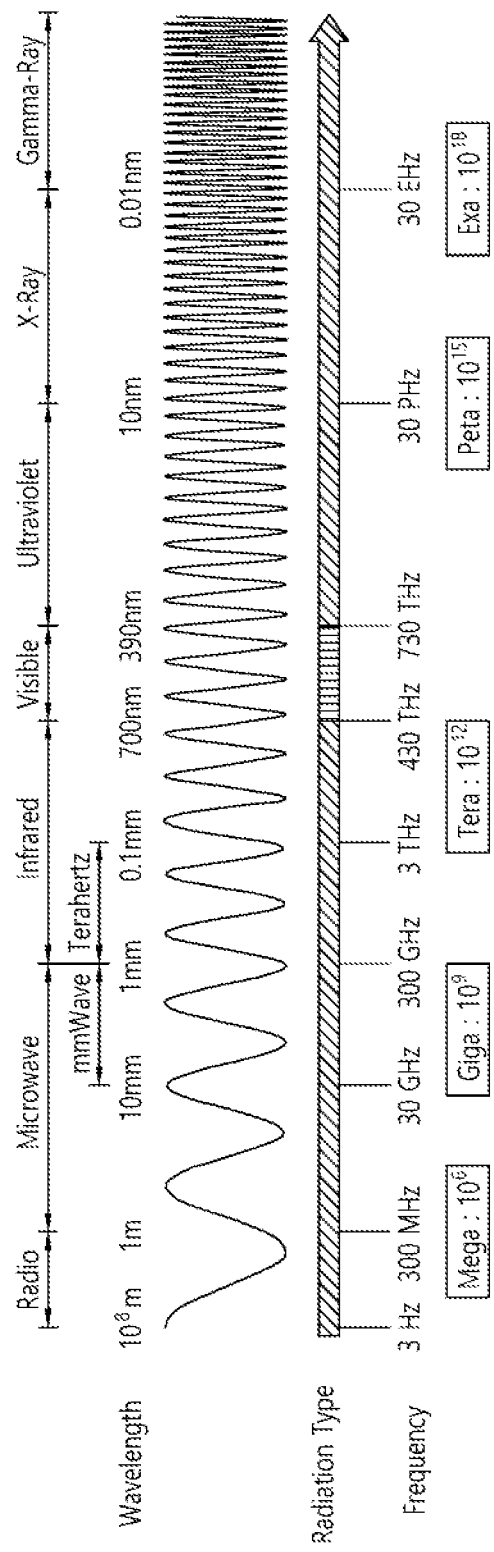
FIG. 3 illustrates the electromagnetic spectrum.

FIG. 3 illustrates the electromagnetic spectrum.

The data rate can be increased by increasing the bandwidth. This can be done using sub-THz communication with wide bandwidth and applying advanced massive MIMO technology. THz waves, also known as submillimeter radiation, typically represent a frequency band between 0.1 THz and 10 THz with corresponding wavelengths in the range of 0.03 mm-3 mm. The 100 GHz-300 GHz band range (sub THz band) is considered a major part of the THz band for cellular communications. Adding sub-THz bands to mmWave bands increases 6G cellular capacity. Among the defined THz bands, 300 GHz-3 THz is in the far infrared (IR) frequency band.

The main characteristics of THz communications include (i) widely available bandwidth to support very high data rates, and (ii) high path loss at high frequencies (highly directional antennas are indispensable). The narrow beamwidth produced by the highly directional antenna reduces interference. The small wavelength of the THz signal allows a much larger number of antenna elements to be incorporated into devices and/or base stations operating in this band. This enables advanced adaptive array technology to overcome range limitations.

Figure 4:
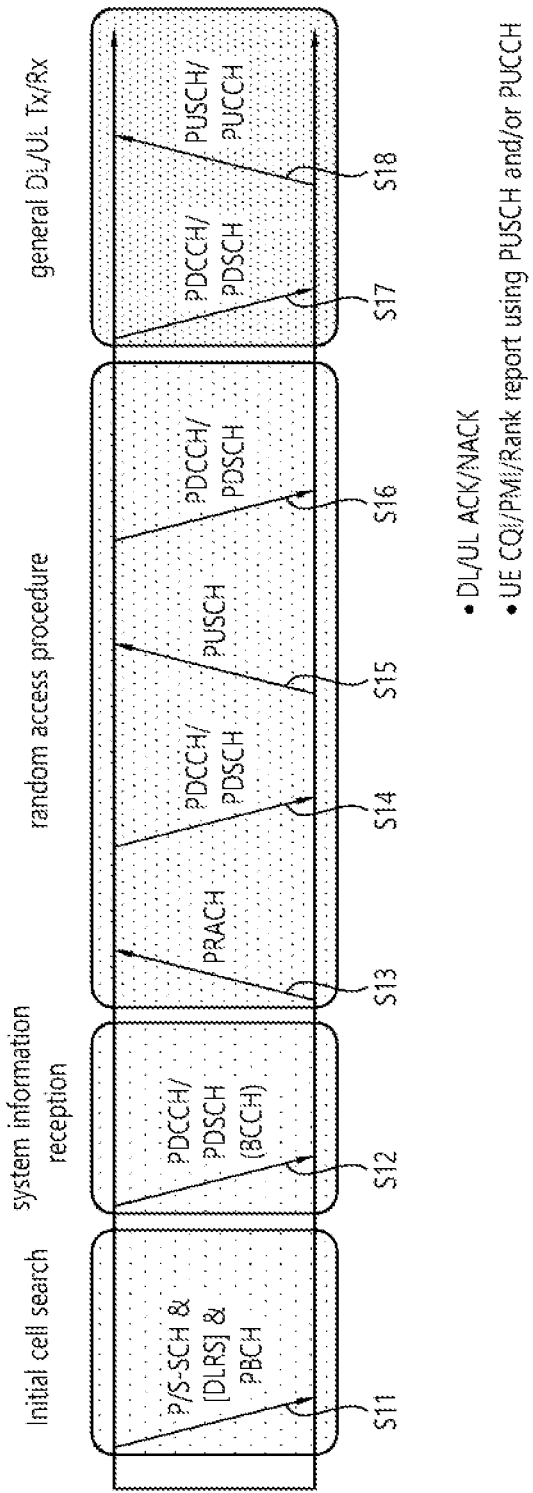
FIG. 4 illustrates physical channels and general signal transmission used in a 3GPP system.

FIG. 4 illustrates physical channels and general signal transmission used in a 3GPP system.

Referring to FIG. 4, in a wireless communication system, a UE receives information from a base station through a downlink (DL), and the UE transmits information to a base station through an uplink (UL). The information transmitted and received between the base station and the UE includes data and various control information, and various physical channels exist according to the type/use of the information they transmit and receive.

When the UE is powered on or newly enters a cell, the UE performs an initial cell search operation such as synchronizing with the base station (S11). To this end, the UE receives a primary synchronization signal (PSS) and a secondary synchronization signal (SSS) from the base station, synchronizes with the base station, and obtains information such as a cell ID. Thereafter, the UE may receive a physical broadcast channel (PBCH) from the base station to obtain intra-cell broadcast information. Meanwhile, the UE may receive a downlink reference signal (DL RS) in the initial cell search step to check the downlink channel state.

After the initial cell search, the UE may receive a Physical Downlink Control Channel (PDCCH) and a Physical Downlink Control Channel (PDSCH) according to information carried on the PDCCH to obtain more specific system information (S12).

On the other hand, when accessing the base station for the first time or there is no radio resource for signal transmission, the UE may perform a random access procedure (RACH) to the base station (S13 to S16). To this end, the UE transmits a specific sequence as a preamble through a Physical Random Access Channel (PRACH) (S13 and S15), a response message ((Random Access Response (RAR) message) for the preamble may be received through the PDCCH and the corresponding PDSCH. In the case of contention-based RACH, a contention resolution procedure may be additionally performed (S16).

After performing the procedure as described above, the UE may perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive downlink control information (DCI) through the PDCCH. Here, the DCI includes control information such as resource allocation information for the UE, and different formats may be applied according to the purpose of use.

On the other hand, the control information transmitted by the UE to the base station through the uplink or received by the UE from the base station is a downlink/uplink ACK/NACK signal, a channel quality indicator (CQI), a precoding matrix index (PMI), and a rank indicator (RI) and the like. The UE may transmit the above-described control information such as CQI/PMI/RI through PUSCH and/or PUCCH.

<Structure of Uplink and Downlink Channels>

1. Downlink Channel Structure

The base station may transmit a related signal to the UE through a downlink channel to be described later, and the UE may receive a related signal from the base station through a downlink channel to be described later.

(1) Physical Downlink Shared Channel (PDSCH)

PDSCH carries downlink data (e.g., DL-shared channel transport block, DL-SCH TB), and modulation methods such as Quadrature Phase Shift Keying (QPSK), 16 Quadrature Amplitude Modulation (QAM), 64 QAM, and 256 QAM are applied to the PDSCH. A codeword is generated by encoding a transport block (TB). A PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS), is generated as an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 CCEs (Control Channel Elements) according to an Aggregation Level (AL). One CCE consists of six REGs (Resource Element Groups). One REG is defined as one OFDM symbol and one (P)RB.

The UE obtains DCI transmitted through the PDCCH by performing decoding (also known as, blind decoding) on a set of PDCCH candidates. A set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

2. Uplink Channel Structure

The UE transmits a related signal to the base station through an uplink channel to be described later, and the base station receives the related signal from the UE through an uplink channel to be described later.

(1) Physical Uplink Shared Channel (PUSCH)

PUSCH carries uplink data (e.g., UL-shared channel transport block, UL-SCH TB) and/or uplink control information (UCI), and is transmitted based on the waveform such as CP-OFDM (Cyclic Prefix—Orthogonal Frequency Division Multiplexing) waveform, DFT-s-OFDM (Discrete Fourier Transform-spread-Orthogonal Frequency Division Multiplexing) waveform, etc. When the PUSCH is transmitted based on the DFT-s-OFDM waveform, the UE transmits the PUSCH by applying transform precoding. For example, when transform precoding is not possible (e.g., transform precoding is disabled), the UE transmits a PUSCH based on a CP-OFDM waveform, and when transform precoding is possible (e.g., transform precoding is enabled), the UE may transmit a PUSCH based on a CP-OFDM waveform or a DFT-s-OFDM waveform. PUSCH transmission is dynamically scheduled by a UL grant in DCI, or may be semi-statically scheduled (configured grant) based on higher layer (e.g., RRC) signaling (and/or Layer 1 (L1)

signaling (e.g., PDCCH)). PUSCH transmission may be performed on a codebook-based or non-codebook-based basis.

(2) Physical Uplink Control Channel (PUCCH)

The PUCCH carries uplink control information, HARQ-ACK, and/or a scheduling request (SR), and may be divided into a plurality of PUCCHs according to a PUCCH transmission length.

Figure 5:
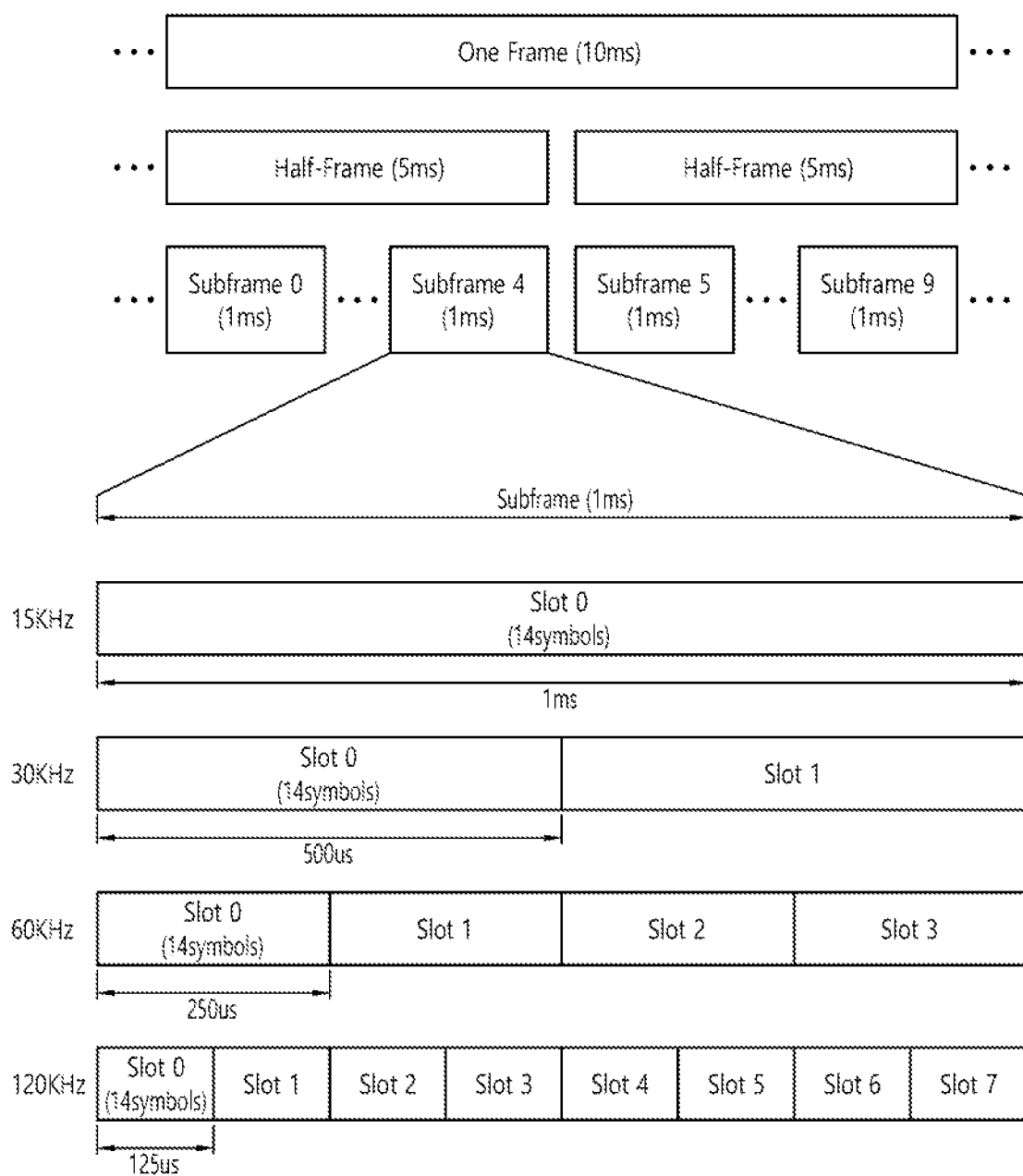
FIG. 5 shows a frame structure in a 3GPP-based wireless communication system to which the implementation of the present specification is applied.

FIG. 5 shows a frame structure in a 3GPP-based wireless communication system to which the implementation of the present specification is applied.

The frame structure shown in FIG. 5 is purely illustrative, and the number of subframes, slots, and/or symbols in a frame may be varied. In a 3GPP-based wireless communication system, OFDM numerologies (e.g., Sub-Carrier Spacing (SCS), Transmission Time Interval (TTI) periods) may be set differently among a plurality of cells aggregated for one UE. For example, when the UE is configured with different SCS for the aggregated cells, the (absolute time) duration of time resources (e.g., subframes, slots, or TTIs) including the same number of symbols may be different between the aggregated cells. Here, the symbol may include an OFDM symbol (or CP-OFDM symbol) and an SC-FDMA symbol (or Discrete Fourier Transform-Spread-OFDM (DFT-s-OFDM) symbol).

Referring to FIG. 5, downlink and uplink transmissions are composed of frames. Each frame has $T_f=10$ ms duration. Each frame is divided into two half-frames, and the duration of each half-frame is 5 ms. Each half frame consists of 5 subframes, and the duration $T_{sf}$ per subframe is 1 ms. Each subframe is divided into slots, and the number of slots in a subframe varies depending on the subcarrier spacing. Each slot includes 14 or 12 OFDM symbols based on CP (Cyclic Prefix). In the normal CP, each slot includes 14 OFDM symbols, and in the extended CP, each slot includes 12 OFDM symbols. The numerology is based on an exponentially scalable subcarrier spacing $\Delta f=2^u * 15$ kHz.

Table 4 shows the number of OFDM symbols per slot $N^{slot}_{symb}$, the number of slots per frame $N^{frame,u}_{slot}$, and the number of slots per subframe $N^{subframe,u}_{slot}$ for a normal CP according to the subcarrier spacing $\Delta f=2^u * 15$ kHz.

TABLE 4

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 5 shows the number of OFDM symbols per slot $N^{slot}_{symb}$, the number of slots per frame $N^{frame,u}_{slot}$, and the number of slots per subframe $N^{subframe,u}_{slot}$ for the extended CP according to the subcarrier spacing $\Delta f=2^u * 15$ kHz.

TABLE 5

| μ | $N^{slot}_{symb}$ | $N^{frame, u}_{slot}$ | $N^{subframe, u}_{slot}$ |
|---|---|---|---|
| 2 | 12 | 40 | 4 |

A slot includes a plurality of symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols starting from Common Resource Block (CRB) $N^{start,u}_{grid}$ indicated by higher layer signaling (e.g., RRC signaling) is defined. Here, $N^{size,u}_{grid,x}$ is the number of resource blocks (RBs) in the resource grid, and the subscript x is DL for downlink and UL for uplink. $N^{RB}_{sc}$ is the number of subcarriers per RB. In a 3GPP based wireless communication system, $N^{RB}_{sc}$ is generally 12. There is one resource grid for a given antenna port p, subcarrier spacing u and transmission direction (DL or UL). The carrier bandwidth $N^{size,u}_{grid}$ for the subcarrier spacing configuration u is given by a higher layer parameter (e.g. RRC parameter). Each element of the resource grid for the antenna port p and the subcarrier spacing u is referred to as a resource element (RE), and one complex symbol may be mapped to each RE. Each RE in the resource grid is uniquely identified by an index k in the frequency domain and an index l representing the position of a symbol relative to a reference point in the time domain. In a 3GPP-based wireless communication system, an RB is defined as 12 consecutive subcarriers in the frequency domain.

In the 3GPP NR system, RBs are divided into CRBs and Physical Resource Blocks (PRBs). CRBs are numbered in an increasing direction from 0 in the frequency domain for the subcarrier spacing configuration u. The center of subcarrier 0 of CRB 0 for the subcarrier spacing configuration u coincides with 'point A' serving as a common reference point for the resource block grid. In 3GPP NR systems, PRBs are defined within a BandWidth Part (BWP) and are numbered from 0 to $N^{size}_{BWP,i} -1$. Here, i is the BWP number. The relationship between PRB $n_{PRB}$ of BWP i and CRB $n_{CRB}$ is as follows. $n_{PRB}=n_{CRB}+N^{size}_{BWP,i}$, where $N^{size}_{BWP,i}$ is the CRB in which BWP starts with CRB 0 as a reference. BWP includes a plurality of contiguous RBs. A carrier may include up to N (e.g., 5) BWPs. A UE may be configured with one or more BWPs on a given component carrier. Among the BWPs configured in the UE, only one BWP can be activated at a time. The active BWP defines the operating bandwidth of the UE within the cell's operating bandwidth.

In the PHY layer, the uplink transport channels UL-SCH and RACH (Random Access Channel) are mapped to physical channels PUSCH (Physical Uplink Shared Channel) and PRACH (Physical Random Access Channel), respectively. Downlink transport channels DL-SCH, BCH, and PCH are mapped to Physical Downlink Shared Channel (PDSCH), Physical Broadcast Channel (PBCH), and PDSCH, respectively. In the PHY layer, Uplink Control Information (UCI) is mapped to a Physical Uplink Control Channel (PUCCH), and Downlink Control Information (DCI) is mapped to a Physical Downlink Control Channel (PDCCH). The MAC PDU related to the UL-SCH is transmitted by the UE through the PUSCH based on the UL grant, and the MAC PDU related to the DL-SCH is transmitted by the BS through the PDSCH based on the DL assignment.

Figure 6:
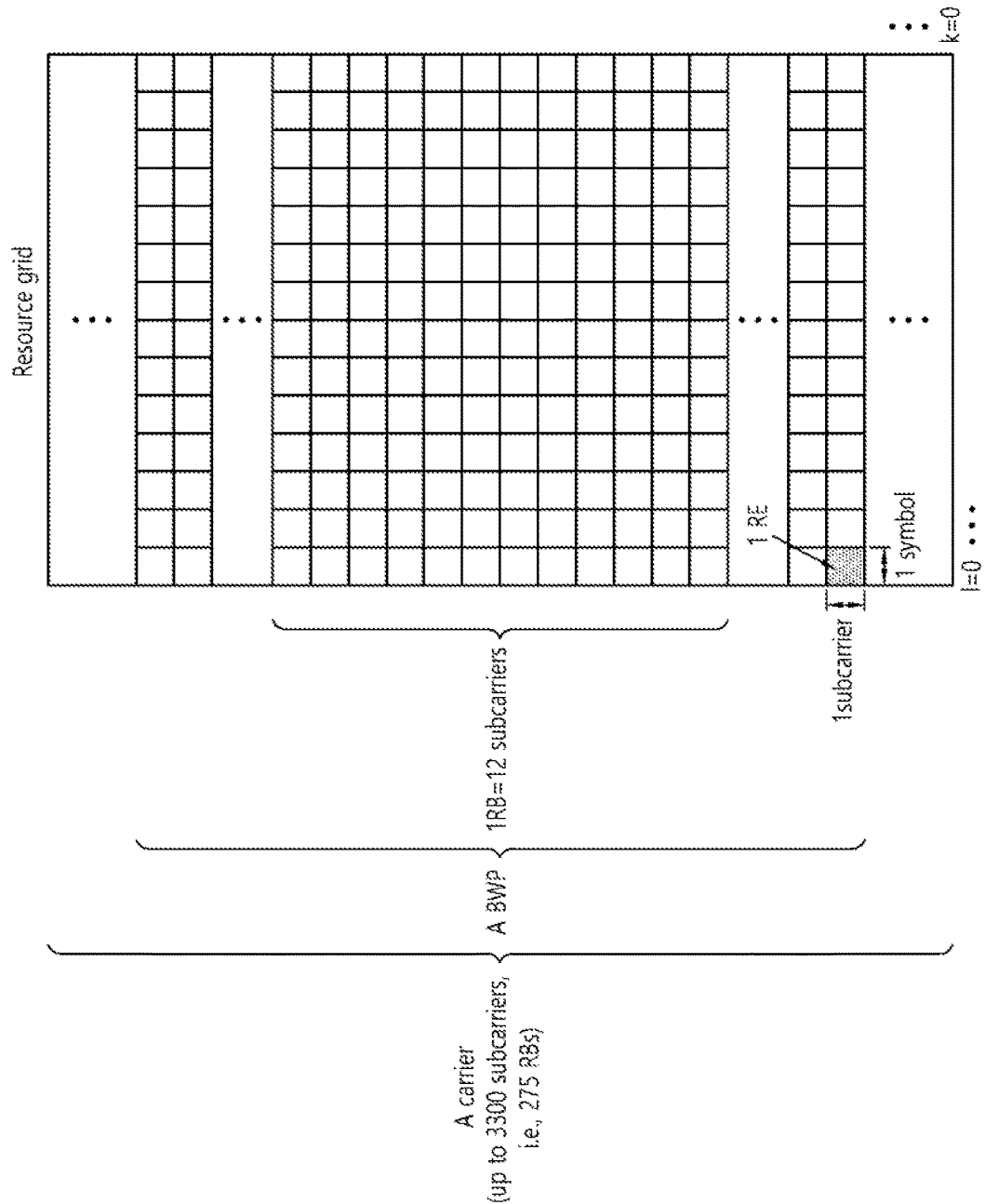
FIG. 6 illustrates a slot structure of an NR frame according to an embodiment of the present disclosure.

FIG. 6 illustrates a slot structure of an NR frame according to an embodiment of the present disclosure.

Referring to FIG. 6, a slot includes a plurality of symbols in the time domain. For example, in the case of a normal CP, one slot includes 14 symbols, but in the case of an extended CP, one slot may include 12 symbols. Alternatively, in the case of a normal CP, one slot includes 7 symbols, but in the case of an extended CP, one slot may include 6 symbols.

A carrier includes a plurality of subcarriers in the frequency domain. A resource block (RB) may be defined as a plurality of (e.g., 12) consecutive subcarriers in the frequency domain. A bandwidth part (BWP) may be defined as a plurality of consecutive (P)RBs ((Physical) Resource Blocks) in the frequency domain, and may correspond to one numerology (e.g., SCS, CP length, etc.). A carrier may include up to N (e.g., 5) BWPs. Data communication may be performed through an activated BWP. Each element may be referred to as a resource element (RE) in the resource grid, and one complex symbol may be mapped.

Meanwhile, a radio interface between a UE and a UE or a radio interface between a UE and a network may be composed of an L1 layer, an L2 layer, and an L3 layer. In various embodiments of the present disclosure, the L1 layer may mean a physical layer. Also, for example, the L2 layer may mean at least one of a medium access control (MAC) layer, a radio link control (RLC) layer, a packet data convergence protocol (PDCP) layer, and a service data adaptation protocol (SDAP) layer. Also, for example, the L3 layer may mean a Radio Resource Control (RRC) layer.

Hereinafter, V2X or SL (sidelink) communication will be described.

FIG. 7 illustrates a radio protocol architecture for SL communication according to an embodiment of the present disclosure. Specifically, (a) of FIG. 7 shows a user plane protocol stack of LTE, and (b) of FIG. 7 shows a control plane protocol stack of LTE.

FIG. 8 illustrates a radio protocol architecture for SL communication according to an embodiment of the present disclosure. Specifically, (a) of FIG. 8 shows a user plane protocol stack of NR, and (b) of FIG. 8 shows a control plane protocol stack of NR.

Hereinafter, the SL synchronization signal (Sidelink Synchronization Signal, SLSS) and synchronization information will be described.

The SLSS is a SL-specific sequence and may include a Primary Sidelink Synchronization Signal (PSSS) and a Secondary Sidelink Synchronization Signal (SSSS). The PSSS may be referred to as a sidelink primary synchronization signal (S-PSS), and the SSSS may be referred to as a sidelink secondary synchronization signal (S-SSS). For example, length-127 M-sequences can be used for S-PSS, and length-127 Gold-sequences can be used for S-SSS. For example, the UE can detect an initial signal using S-PSS and acquire synchronization. For example, the UE may obtain detailed synchronization using S-PSS and S-SSS and detect a synchronization signal ID.

PSBCH (Physical Sidelink Broadcast Channel) may be a (broadcasting) channel through which basic (system) information that a UE needs to know first before transmitting and receiving an SL signal is transmitted. For example, the basic information may be SLSS-related information, duplex mode (DM), TDD UL/Time Division Duplex Uplink/Downlink (TDD UL/DL) configuration, resource pool-related information, types of applications related to SLSS, a subframe offset, broadcast information, and the like. For example, for evaluation of PSBCH performance, in NR V2X, the payload size of PSBCH may be 56 bits including a 24-bit CRC.

S-PSS, S-SSS, and PSBCH may be included in a block format (e.g., SL SS (Synchronization Signal)/PSBCH block, hereinafter S-SSB (Sidelink-Synchronization Signal Block)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth may be (pre) configured SL BWP (Sidelink BWP). For example, the bandwidth of the S-SSB may be 11 Resource Blocks (RBs). For example, PSBCH may span 11 RBs. And, the frequency position of the S-SSB may be set (in advance). Therefore, the UE does not need to perform hypothesis detection in frequency to discover the S-SSB in the carrier.

Meanwhile, in the NR SL system, a plurality of numerologies having different SCS and/or CP lengths may be supported. In this case, as the SCS increases, the length of time resources through which the transmitting UE transmits the S-SSB may be shortened. Accordingly, coverage of the S-SSB may decrease. Therefore, in order to guarantee coverage of the S-SSB, the transmitting UE may transmit one or more S-SSBs to the receiving UE within one S-SSB transmission duration according to the SCS. For example, the number of S-SSBs that the transmitting UE transmits to the receiving UE within one S-SSB transmission duration may be pre-configured or configured for the transmitting UE. For example, the S-SSB transmission duration may be 160 ms. For example, for all SCSs, an S-SSB transmission duration of 160 ms may be supported.

For example, when the SCS is 15 kHz in FR1, the transmitting UE may transmit one or two S-SSBs to the receiving UE within one S-SSB transmission duration. For example, when the SCS is 30 kHz in FR1, the transmitting UE may transmit one or two S-SSBs to the receiving UE within one S-SSB transmission duration. For example, when the SCS is 60 kHz in FR1, the transmitting UE may transmit one, two or four S-SSBs to the receiving UE within one S-SSB transmission duration.

For example, when the SCS is 60 kHz in FR2, the transmitting UE can transmit 1, 2, 4, 8, 16 or 32 S-SSBs to the receiving UE within one S-SSB transmission duration. For example, if the SCS is 120 kHz in FR2, the transmitting UE can transmit 1, 2, 4, 8, 16, 32 or 64 S-SSBs to the receiving UE within one S-SSB transmission duration.

Meanwhile, when the SCS is 60 kHz, two types of CPs may be supported. In addition, the structure of the S-SSB transmitted from the transmitting UE to the receiving UE may be different according to the CP type. For example, the CP type may be Normal CP (NCP) or Extended CP (ECP). Specifically, for example, when the CP type is NCP, the number of symbols mapping the PSBCH in the S-SSB transmitted by the transmitting UE may be 9 or 8. On the other hand, for example, when the CP type is ECP, the number of symbols mapping the PSBCH in the S-SSB transmitted by the transmitting UE may be 7 or 6. For example, a PSBCH may be mapped to a first symbol in an S-SSB transmitted by a transmitting UE. For example, a receiving UE receiving the S-SSB may perform an automatic gain control (AGC) operation in the first symbol period of the S-SSB.

Figure 9:
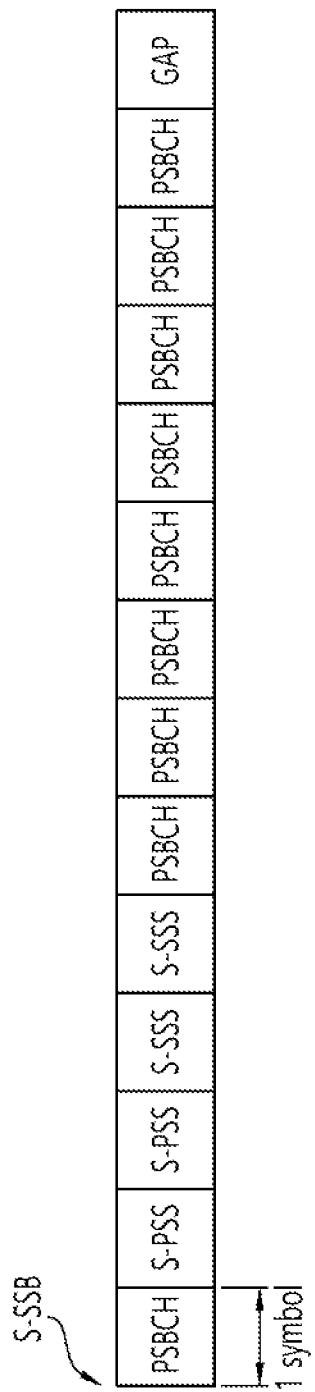
FIG. 9 illustrates a structure of an S-SSB when a CP type is an NCP according to an embodiment of the present disclosure.

FIG. 9 illustrates a structure of an S-SSB when a CP type is an NCP according to an embodiment of the present disclosure.

For example, when the CP type is NCP, the structure of the S-SSB, that is, the sequence of symbols to which the S-PSS, S-SSS, and PSBCH are mapped in the S-SSB transmitted by the transmitting UE may refer to FIG. 9.

Figure 10:
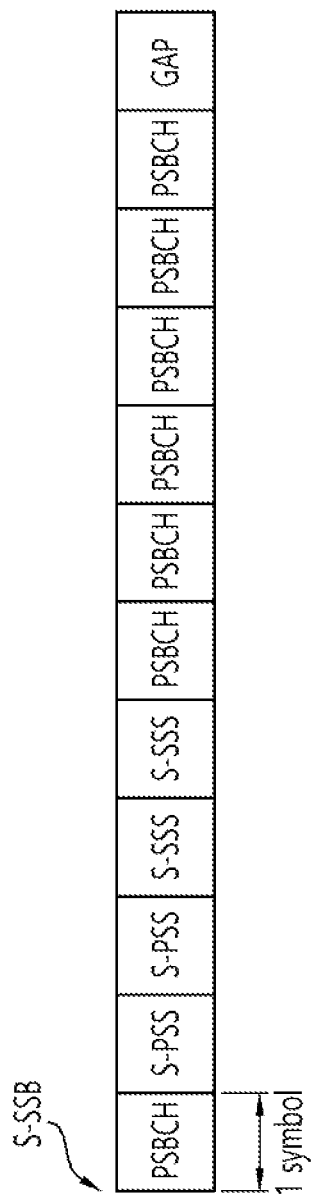
FIG. 10 illustrates a structure of an S-SSB when a CP type is ECP according to an embodiment of the present disclosure.

FIG. 10 illustrates a structure of an S-SSB when a CP type is ECP according to an embodiment of the present disclosure.

For example, when the CP type is ECP, unlike FIG. 9, the number of symbols for mapping the PSBCH after the S-SSS in the S-SSB by the transmitting UE may be 6. Accordingly, the coverage of the S-SSB may be different depending on whether the CP type is the NCP or the ECP.

Meanwhile, each SLSS may have a Sidelink Synchronization Identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, among two different S-PSSs, one S-PSS may be associated with in-coverage and the other S-PSS may be associated with out-of-coverage. For example, SLSS IDs from 0 to 335 can be used in in-coverage, and SLSS IDs from 336 to 671 can be used in out-coverage.

Meanwhile, in order to improve S-SSB reception performance of the receiving UE, the transmitting UE needs to optimize transmission power according to the characteristics of each signal constituting the S-SSB. For example, according to the peak to average power ratio (PAPR) of each signal constituting the S-SSB, the transmitting UE may determine a maximum power reduction (MPR) value for each signal. For example, if the PAPR values are different between the S-PSS and S-SSS constituting the S-SSB, in order to improve the S-SSB reception performance of the receiving UE, the transmitting UE may apply each optimal MPR value for transmission of S-PSS and S-SSS. Also, for example, a transition period may be applied in order for the transmitting UE to perform an amplification operation on each signal. The transition period may preserve a time required for the transmitting UE amplifier of the transmitting UE to perform a normal operation at the boundary where the transmission power of the transmitting UE varies. For example, in the case of FR1, the transition period may be 10us. For example, in the case of FR2, the transition period may be 5us. For example, a search window for the receiving UE to detect the S-PSS may be 80 ms and/or 160 ms.

Figure 11:
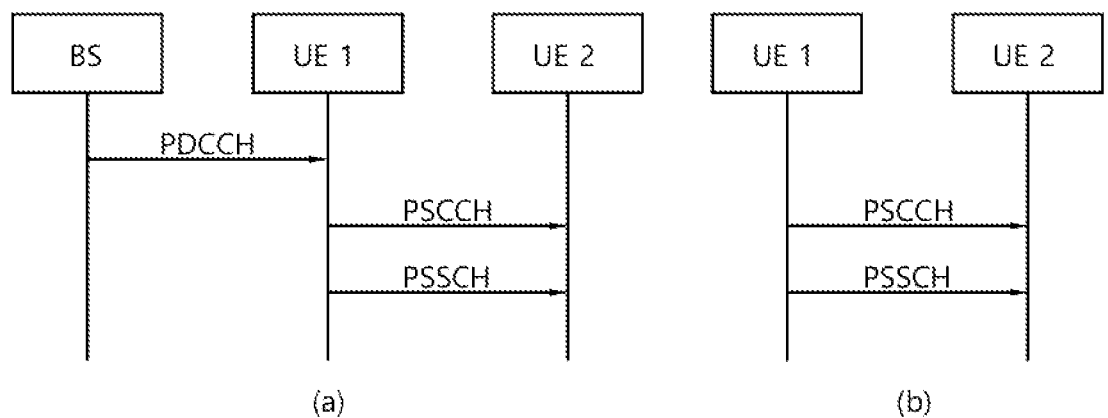
FIG. 11 illustrates a procedure for a UE to perform V2X or SL communication according to a transmission mode according to an embodiment of the present disclosure.

FIG. 11 illustrates a procedure for a UE to perform V2X or SL communication according to a transmission mode according to an embodiment of the present disclosure. In various embodiments of the present disclosure, the transmission mode may be referred to as a mode or a resource allocation mode. Hereinafter, for convenience of description, a transmission mode in LTE may be referred to as an LTE transmission mode, and a transmission mode in NR may be referred to as an NR resource allocation mode.

For example, (a) of FIG. 11 shows a UE operation related to LTE transmission mode 1 or LTE transmission mode 3. Or, for example, (a) of FIG. 11 shows a UE operation related to NR resource allocation mode 1. For example, LTE transmission mode 1 may be applied to general SL communication, and LTE transmission mode 3 may be applied to V2X communication.

For example, (b) of FIG. 11 shows a UE operation related to LTE transmission mode 2 or LTE transmission mode 4. Or, for example, (b) of FIG. 11 shows a UE operation related to NR resource allocation mode 2.

Referring to (a) of FIG. 11, in LTE transmission mode 1, LTE transmission mode 3, or NR resource allocation mode 1, the base station may schedule SL resources to be used by the UE for SL transmission. For example, the base station may perform resource scheduling to UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 through physical sidelink control channel (PSCCH), and then transmit data based on the SCI to UE 2 through physical sidelink shared channel (PSSCH).

Referring to (b) of FIG. 11, in LTE transmission mode 2, LTE transmission mode 4, or NR resource allocation mode 2, the UE may determine an SL transmission resource within an SL resource set by the base station/network or a preset SL resource. For example, the set SL resource or the preset SL resource may be a resource pool. For example, the UE may autonomously select or schedule resources for SL transmission. For example, the UE may perform SL communication by selecting a resource by itself within a configured resource pool. For example, the UE may select a resource by itself within a selection window by performing a sensing and resource (re)selection procedure. For example, the sensing may be performed in units of subchannels. In addition, UE 1, which has selected a resource within the resource pool, transmits SCI to UE 2 through PSCCH, and then transmits data based on the SCI to UE 2 through PSSCH.

Figure 12:
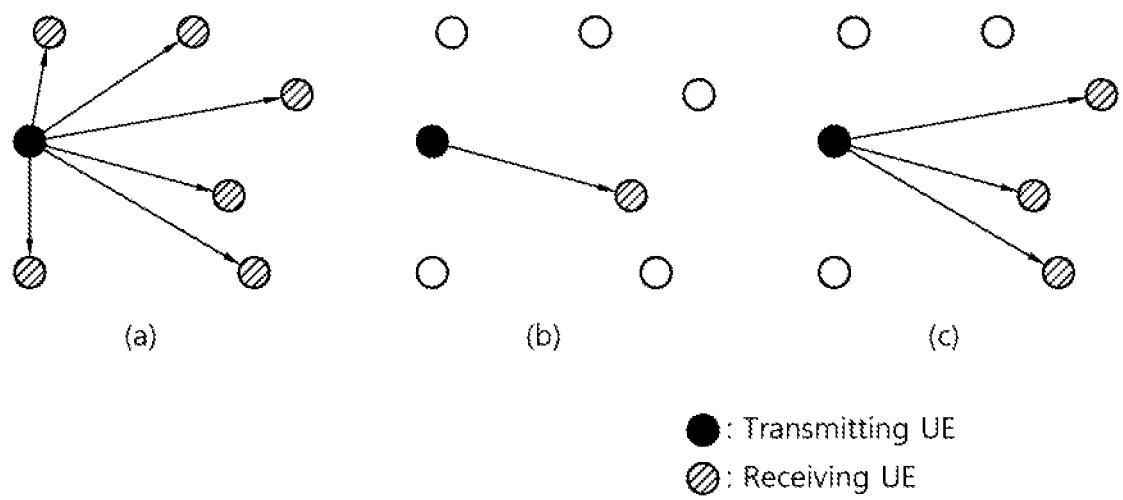
FIG. 12 shows three cast types.

FIG. 12 shows three cast types.

(a) of FIG. 12 shows broadcast type SL communication, (b) of FIG. 12 shows unicast type SL communication, and (c) of FIG. 12 shows groupcast type SL communication. In the case of unicast type SL communication, a UE may perform one-to-one communication with another UE. In the case of SL communication of the groupcast type, a UE may perform SL communication with one or more UEs in a group to which it belongs. In various embodiments of the present disclosure, SL groupcast communication may be replaced with SL multicast communication, SL one-to-many communication, and the like.

The present disclosure will now be described.

Figure 13:
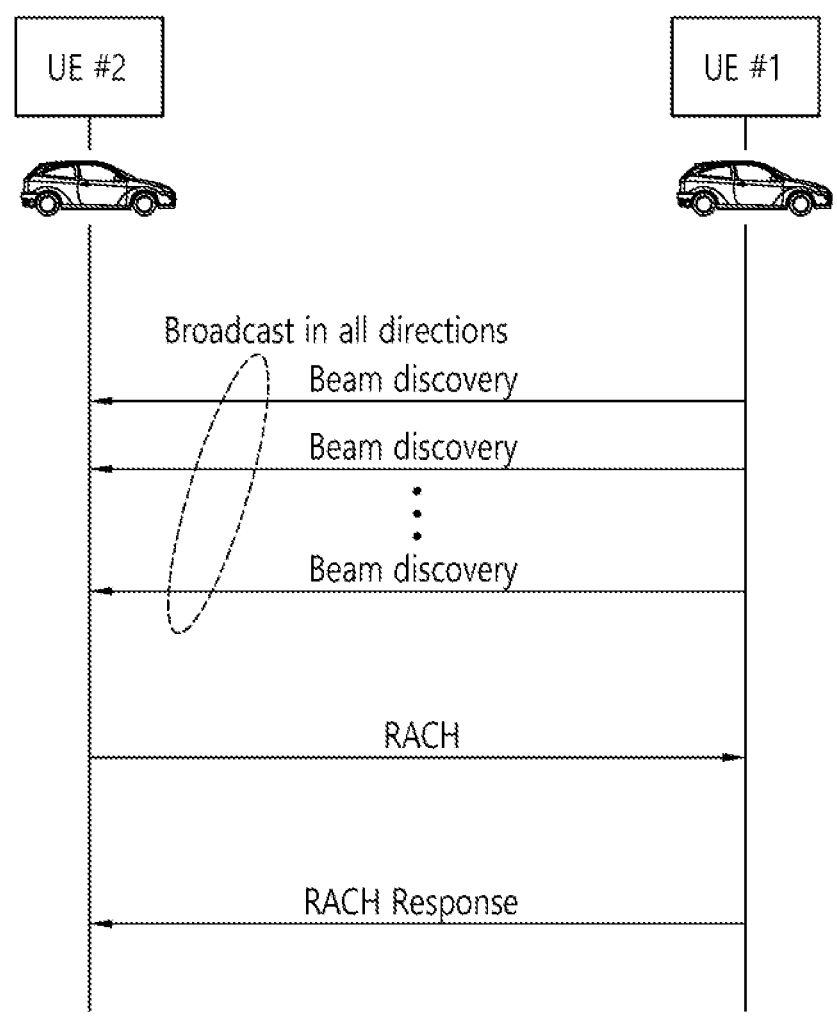
FIG. 13 illustrates a V2X communication procedure between UEs installed in a vehicle (or between vehicles) in the prior art.

FIG. 13 illustrates a V2X communication procedure between UEs installed in a vehicle (or between vehicles) in the prior art.

Referring to FIG. 13, let's assume that UE #1 and UE #2 participate in V2X communication.

First, UE #1 broadcasts a beam discovery signal (or message) to its neighbors in all directions through a directional beam. This may be referred to as a process in which UE #1 informs its surroundings of its existence.

After receiving the beam discovery signal, UE #2 transmits a random access channel (RACH) in response thereto. UE #1 transmits a RACH response to UE #2. Through this process, V2X communication between UE #1 and UE #2 is set up.

This process is a communication setup procedure necessary for bidirectional communication between UE #1 and UE #2. However, if unidirectional communication is to be performed between UE #1 and UE #2 (e.g., unidirectional communication in which UE #2 transmits a signal to UE #1 or UE #1 transmits a signal to UE #2), RACH transmission may be an unnecessary procedure, and a latency problem occurs due to an unnecessary RACH transmission procedure. In addition, when a plurality of vehicles transmit RACH, a collision problem may occur even if different Zadoff-Chu (ZC) sequences are used.

The present disclosure proposes an efficient method for a V2X communication setup procedure in a unidirectional service such as groupcast. According to the method according to the present disclosure, unlike the prior art method, unidirectional V2X communication can be smoothly performed without RACH transmission used in response to the beam discovery signal and RACH response transmission used in response to the RACH transmission.

Hereinafter, the method according to the present disclosure will be described as an example of a V2X communication setup procedure, but this is not a limitation. That is, the method according to the present disclosure may be applied not only to V2X communication but also to initial beam alignment of mmWave beams. That is, it is not limited to V2X communication.

Figure 14:
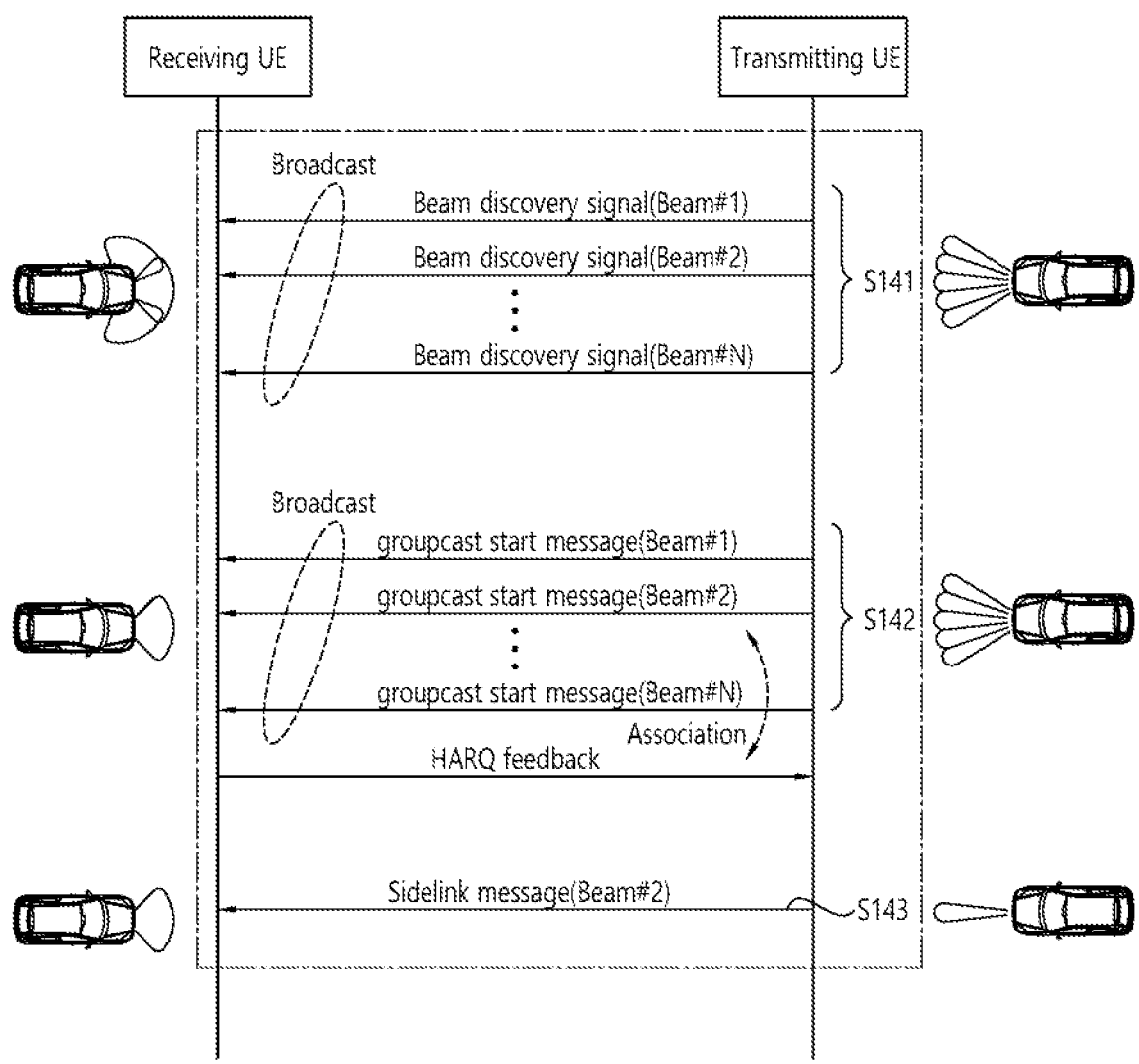
FIG. 14 illustrates a V2X communication setup procedure.

FIG. 14 illustrates a V2X communication setup procedure.

Referring to FIG. 14, the transmitting UE may perform steps 1, 2, and 3 below.

Step 1 (S141): A transmitting UE broadcasts a beam discovery signal (sequence or message) informing neighboring UEs of its existence (transmitting UE) through a plurality of directional beams for a groupcast service. That is, beam discovery signals can be transmitted in all directions. For example, the transmitting UE may repeatedly transmit the same beam discovery signal periodically (e.g., 160 ms (millisecond)) through beam #1, beam #2, . . . , and beam #N.

The receiving UE searches for a best transmission/reception (Tx/Rx) beam among beam discovery signals that are repeatedly transmitted at regular intervals. For example, if there are three RX beams supported by the receiving UE, an optimum RX beam may be found among the three RX beams. This may be referred to as a process of selecting an optimal filter/parameter combination while changing various filter/parameter combinations for receiving a signal.

Step 2 (S142): The transmitting UE broadcasts a message informing the start of the groupcast service (groupcast start message) to neighboring UEs through a plurality of directional beams for groupcast for the V2X service.

That is, the groupcast start message can be transmitted in all directions. For example, the transmitting UE may periodically and repeatedly transmit the groupcast start message through beam #1, beam #2, . . . , beam #N.

The receiving UE receives the groupcast start message using the best reception beam of step 1 and transmits HARQ feedback corresponding thereto to the transmitting UE through a feedback channel. Through this, it is possible to notify the transmitting UE that it is interested in the groupcast service. For example, the receiving UE may receive the groupcast start message, transmitted by the transmitting UE through beam #2, through the best reception beam and transmit HARQ feedback for it. Through this, it is possible to implicitly/explicitly inform the transmitting UE of the best transmission beam for the receiving UE at the same time as notifying that there is interest in the groupcast service.

Step 3 (S143): The transmitting UE selects the best beam for the receiving UE based on the timing of the HARQ feedback of the receiving UE. For example, HARQ feedback timing for beam #1, HARQ feedback timing for beam #2, . . . , HARQ feedback timing for beam #N in step 2 may be distinguished from each other. For example, timing may be determined to receive HARQ feedback after M slots at the time of transmitting beam #m. In other words, HARQ feedback timing for each beam is associated (related with). Therefore, based on the timing of the HARQ feedback, the transmitting UE can know whether the receiving UE has provided HARQ feedback for the groupcast start message transmitted through which beam. That is, the best transmission beam for the receiving UE can be known. That is, based on the timing of HARQ feedback, the transmitting UE can select the best transmission beam for the receiving UE. Here, the timing of HARQ feedback is exemplified, but is not necessarily limited thereto. In general, the resource (frequency/time) transmitting beam #m and the HARQ feedback resource (frequency/resource) may be related/associated/corresponded.

From the subsequent process, the transmitting UE/receiving UE each communicates with each other using the best transmission beam/best reception beam. For example, a transmitting UE transmits a sidelink message through a best transmission beam, and a receiving UE receives the sidelink message through a best reception beam.

From the point of view of a receiving UE, a discovery signal transmitted through a plurality of beams by a transmitting UE is received through a reception beam, and the discovery signal includes a message notifying the start of a groupcast service.

The receiving UE transmits feedback about the message to the transmitting UE, and the feedback is transmitted through a first resource related to a first beam among the plurality of beams through which the message is transmitted.

After that, the receiving UE receives the sidelink message, group-cast by the transmitting UE through the first beam, through the reception beam.

Meanwhile, in FIG. 14, steps 1 and 2 are separate processes for convenience of description, but this is not a limitation. That is, steps 1 and 2 may be integrated and performed as one process. For example, when the beam discovery signal is transmitted in the form of a message, a groupcast start message may be included in the message and transmitted, and the receiving UE transmits HARQ feedback for the beam discovery signal (message) including the groupcast start message can be transmitted to the UE.

According to this method, it is possible to set up communication between the UEs even though the RACH transmission/RACH response transmission process is omitted in the unidirectional communication setup process between the UEs. Therefore, compared to the prior art, there is an advantage in that delay is small and fast communication setup is possible.

Figure 15:
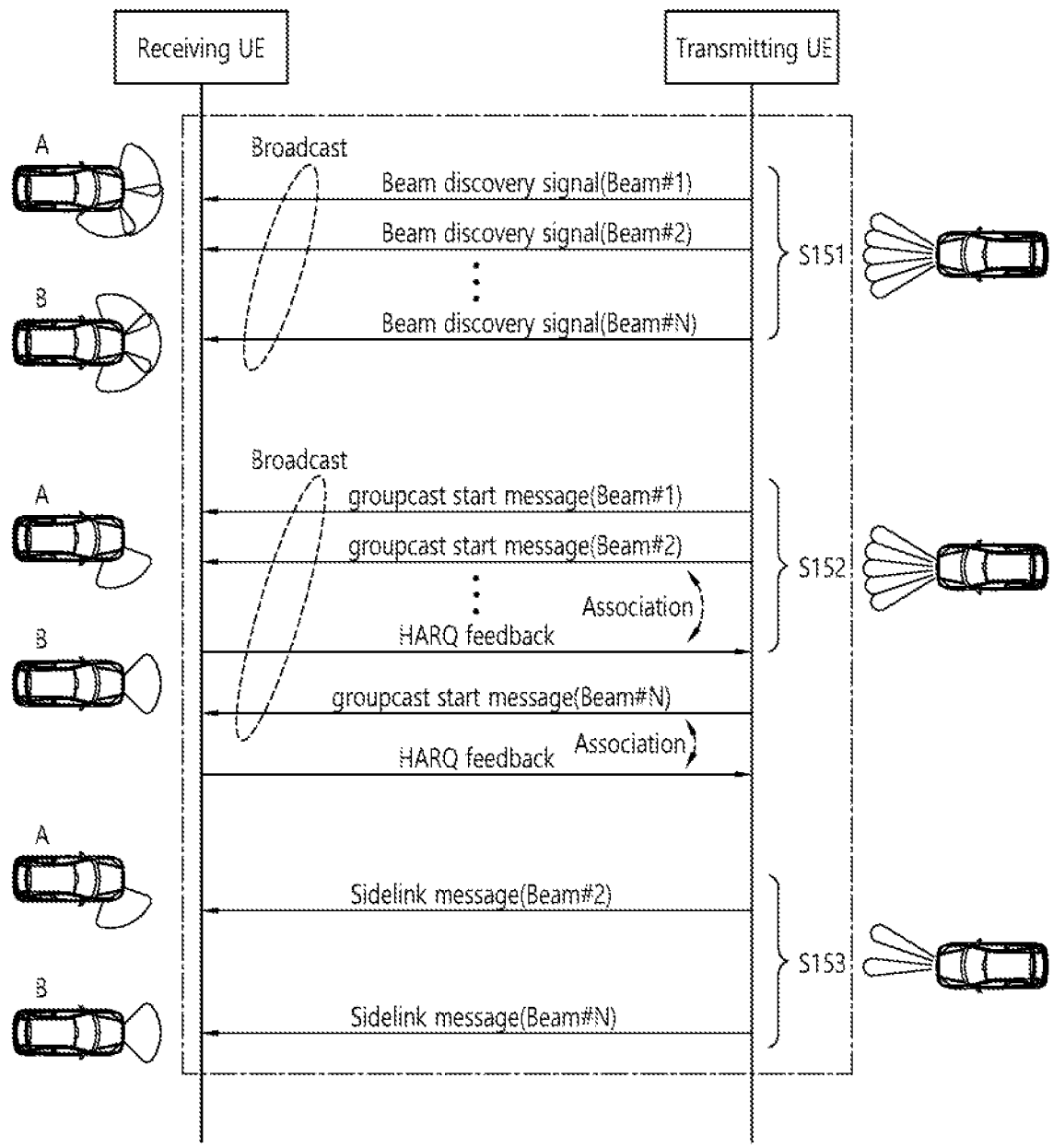
FIG. 15 illustrates a V2X communication setup procedure for the case where a plurality of receiving UEs exist.

FIG. 15 illustrates a V2X communication setup procedure for the case where a plurality of receiving UEs exist.

Referring to FIG. 15, the transmitting UE may perform steps 1, 2, and 3 below.

Step 1 (S151): A transmitting UE broadcasts a beam discovery signal (sequence or message) informing neighboring UEs of its existence in all directions through a plurality of directional beams. A plurality of receiving UEs (e.g., receiving UEs A and B) search for the best transmission/reception beam among beam discovery signals that are repeatedly transmitted at regular intervals. For example, the transmitting UE may repeatedly transmit the same beam discovery signal periodically (e.g., 160 ms) through beam #1, beam #2, . . . , and beam #N.

Step 2 (S152): The transmitting UE broadcasts a message informing neighboring UEs of the start of the groupcast service (groupcast start message) in all directions through a plurality of directional beams.

The receiving UE receives the groupcast start message using the best reception beam of step 1 and transmits HARQ feedback corresponding thereto to the transmitting UE through a feedback channel. Through this, it is possible to notify the transmitting UE that it is interested in the groupcast service. For example, the receiving UE A may receive the groupcast start message, transmitted by the transmitting UE through beam #2, through its best reception beam and transmit HARQ feedback for this message. The receiving UE B may receive the groupcast start message, transmitted by the transmitting UE through beam #N, through its own best reception beam and transmit HARQ feedback for this message.

That is, in step 2, a plurality of receiving UEs around the transmitting UE inform the transmitting UE of the HARQ feedback corresponding to the groupcast start message through a feedback channel using their own best reception beam obtained in step 1. Through this, it is possible to implicitly/explicitly inform the transmitting UE of the best transmission beam for the receiving UE at the same time as notifying that there is interest in the groupcast service.

Step 3 (S153): The transmitting UE checks the HARQ feedback timing of receiving UEs A and B and selects the best transmission beam for each receiving UE. In the above example, beam #2 for receiving UE A and beam #N for receiving UE B may be selected.

From the subsequent process, mutual communication is performed between the transmitting UE and the receiving UE using the selected best transmission beam/best reception beam.

According to this method, it is possible to set up communication between the UEs even though the RACH transmission/RACH response transmission process is omitted in the unidirectional communication setup process between the UEs. Therefore, compared to the prior art, there is an advantage in that delay is small and fast communication setup is possible.

Figure 16:
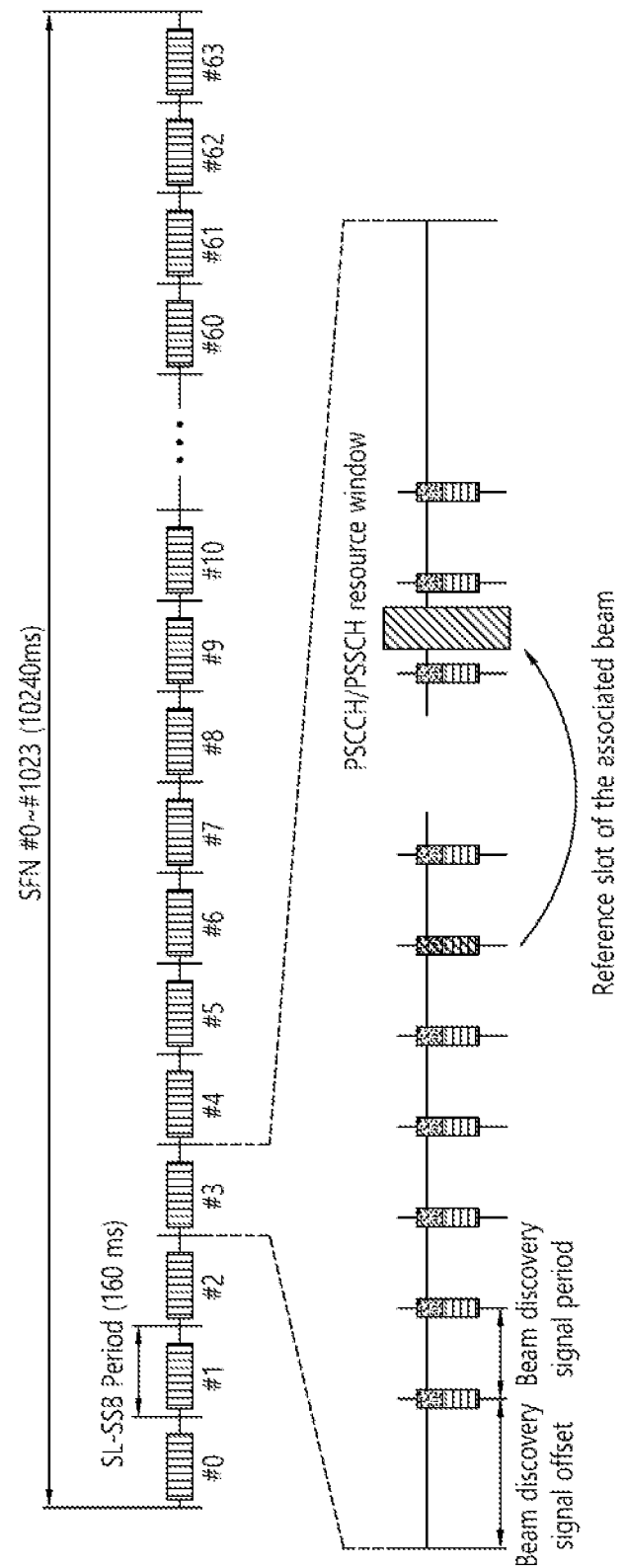
FIG. 16 illustrates a method of transmitting a beam discovery signal.

FIG. 16 illustrates a method of transmitting a beam discovery signal.

In 3GPP NR sidelink, 1, 2, 4, 5, 16, 32, and 64 SL-SSB (sidelink synchronization signal block)s can be transmitted in a system frame number (SFN) #0 to #1023 (=10240 ms) in a cycle of 160 ms. FIG. 16 illustrates a case in which 64 SL-SSBs are transmitted.

In a slot in which the SL-SSB is transmitted, all except for the SL-SSB are null Resource Blocks (RBs). In a slot in which the SL-SSB is transmitted, a beam discovery signal may be transmitted using a frequency adjacent to the SL-SSB. The beam discovery signal may be a sequence of known patterns (hereinafter referred to as discovery sequence) or may have a message form (hereinafter referred to as discovery message).

A discovery sequence or a discovery message may designate resources transmitted using the same beam based on an offset and a window size. 1) Offset and window size are determined by higher layer parameters (parameters set by RRC and MAC layer signals), or 2) Offset is designated by discovery sequence or discovery message and window size is determined by higher layer parameters.

The beam pattern of the beam discovery signal may be repeated at a period of 160 ms, the same as that of SL-SSB, and may be used for reception beam selection in a neighboring UE (or a neighboring vehicle).

The following table illustrates the number of slots in an SSB period according to SCS.

TABLE 6

| SCS (kHz) | Number of slots in a frame (10 ms) | Number of slots within SSB period (160 ms) |
|---|---|---|
| 15 | 10 | 160 |
| 30 | 20 | 320 |
| 60 | 40 | 640 |
| 120 | 80 | 1280 |
| 240 | 160 | 2560 |

Figure 17:
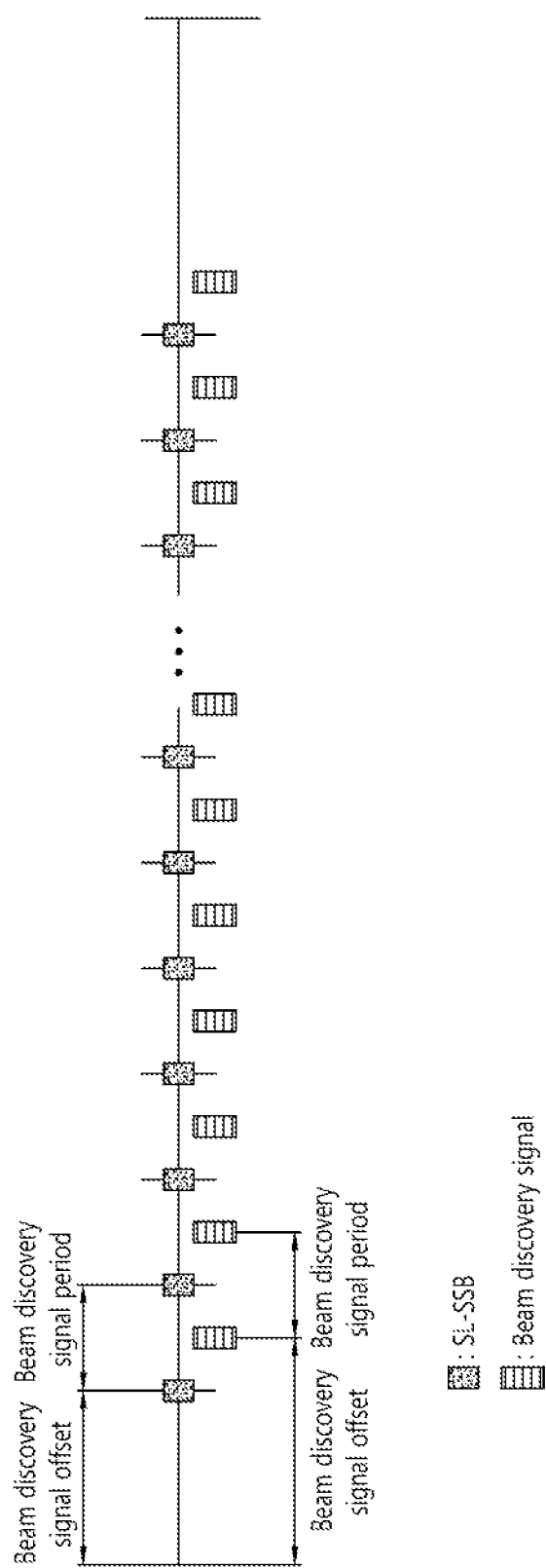
FIG. 17 illustrates another method of transmitting a beam discovery signal.

FIG. 17 illustrates another method of transmitting a beam discovery signal.

Unlike FIG. 16, the beam discovery signal in the time domain may be transmitted in a slot having a constant offset value from a slot in which an SL-SSB, using the same beam, is transmitted. In the frequency domain, the beam discovery signal may be transmitted using a frequency adjacent to the frequency at which the SL-SSB is transmitted.

A discovery sequence or a discovery message may designate resources transmitted using the same beam based on an offset and a window size. 1) Offset and window size are determined by higher layer parameters (parameters set by RRC and MAC layer signals), or 2) Offset is designated by discovery sequence or discovery message and window size is determined by higher layer parameters.

Figure 18:
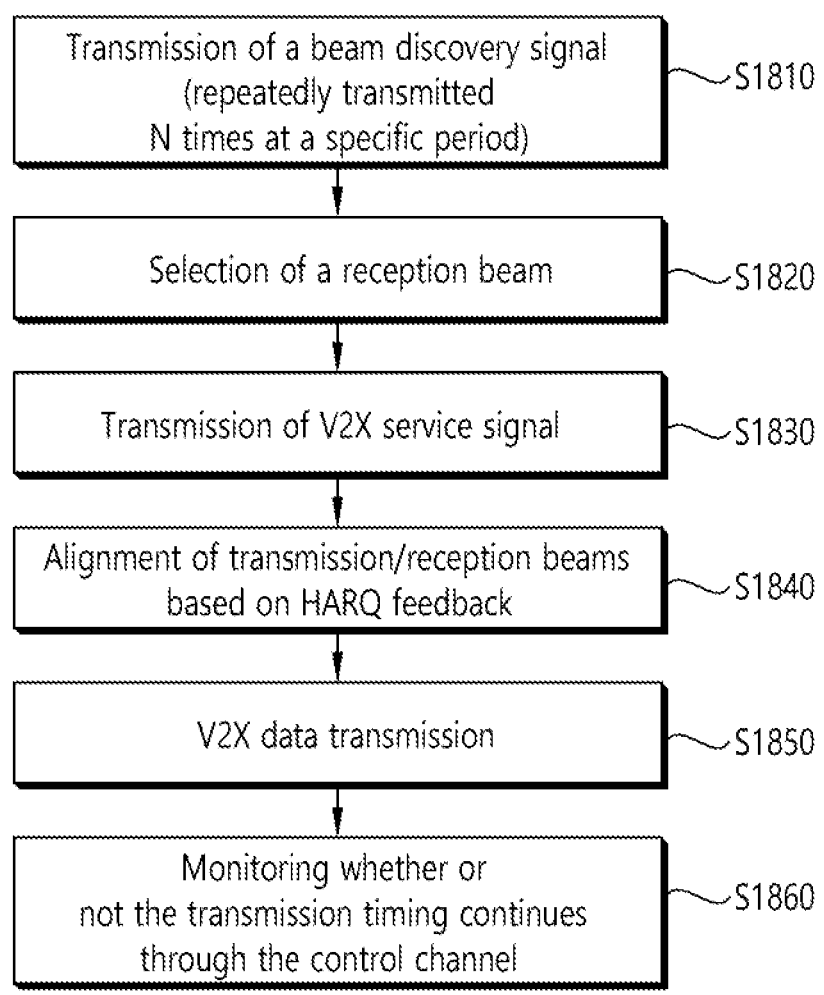
FIG. 18 illustrates an operation between V2X UEs.

FIG. 18 illustrates an operation between V2X UEs.

Referring to FIG. 18, V2X operation between V2X UEs can be largely divided into a discovery step and a V2X service step. The discovery step may include, for example, transmission of a beam discovery signal of the transmitting UE (e.g., the beam discovery signal may be repeatedly transmitted N times using different transmission beams sequentially at a specific period) (S1810), selection of a reception beam of a receiving UE (S1820) (the receiving UE may measure beam discovery signals transmitted through the different transmission beams and select its own best reception beam), a transmission of V2X service signal of the transmitting UE (e.g., the above-described groupcast start message can be repeatedly transmitted using different transmission beams sequentially at a specific period) (S1830), alignment of transmission/reception beams based on HARQ feedback provided by the receiving UE (S1840). In step S1840, for example, the transmitting UE may select the best transmission beam for the receiving UE based on whether the receiving UE performed HARQ feedback using a resource associated with (corresponding to) which transmission beam. Through this process, the best transmission beam of the transmitting UE and the best reception beam of the receiving UE can be determined. This may be referred to as transmission/reception beam alignment.

The V2X service step may include, for example, V2X data transmission through the above-described best transmission beam (S1850) and monitoring whether or not the transmission timing continues through the control channel (S1860). The control channel may be, for example, a physical sidelink feedback channel (PSFCH). The transmitting UE may monitor whether there is a problem in the radio channel with the receiving UE, such as when HARQ feedback for the V2X data is not received over a certain period of time through the PSFCH or when the NACK rate exceeds a certain value for a specific time period. If it is determined that there is no problem, the V2X data is continuously transmitted while maintaining the existing transmission timing, and if it is determined that there is a problem, a recovery step described later may be performed.

At the end of the discovery step, unnecessary resources may be gradually removed through HARQ feedback information fed back from nearby UEs of interest or vehicles. For example, among N (N is a natural number equal to or greater than 2) beams, beams to which the receiving UE has not performed HARQ feedback may not be reserved. In addition, among candidate resources capable of transmitting a beam discovery signal or a groupcast start message, candidate resources for which the receiving UE has not performed HARQ feedback may be released without further reservation. Through this, V2X data service resources can be adjusted so as not to be insufficient.

Figure 19:
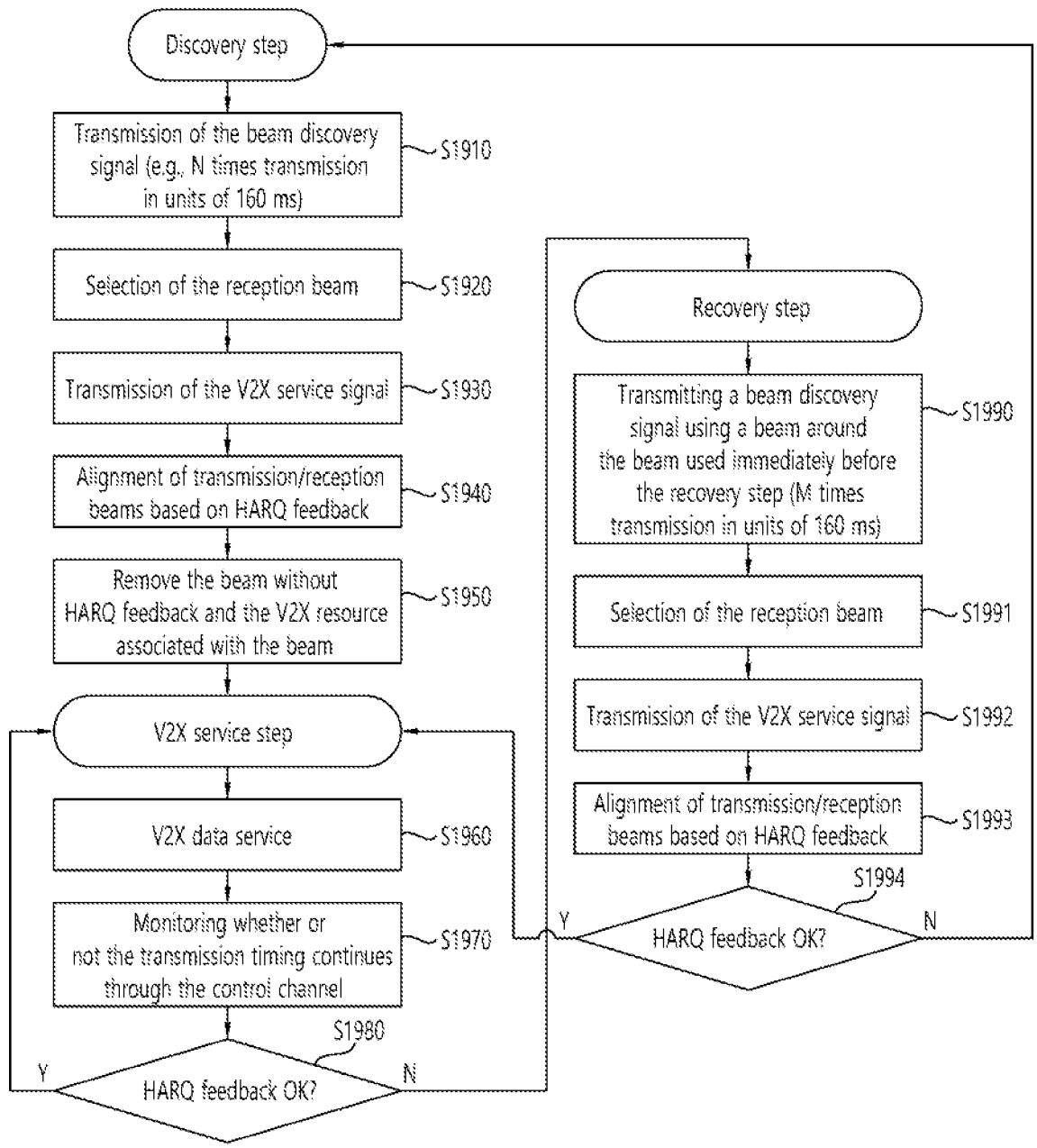
FIG. 19 illustrates an operation between V2X UEs including a recovery process.

FIG. 19 illustrates an operation between V2X UEs including a recovery process.

In FIG. 19, a problem occurs in the radio channel in V2X data transmission (e.g., assuming that HARQ feedback transmission is stopped for a certain period of time (e.g., X slots)), and a recovery step is added.

The discovery step is the same as described in FIG. 18. That is, transmission of the beam discovery signal of the transmitting UE (S1910), selection of the reception beam of the receiving UE (S1920), transmission of the V2X service signal of the transmitting UE (S1930), alignment of transmission/reception beams based on HARQ feedback provided by the receiving UE (S1940) may be included. After that, the beam without HARQ feedback and the V2X resource associated with the beam are removed (S1950).

The V2X service step is also the same as described in FIG. 18. That is, it may include the steps of transmitting V2X data (service) through the aforementioned best transmission beam (S1960) and monitoring whether or not the transmission timing continues through the control channel (S1970).

According to the monitoring, the transmitting UE determines whether the HARQ feedback is normally performed (S1980), and if the HARQ feedback is normal, the V2X service continues, and if the HARQ feedback is not normal, the recovery steps are performed.

The recovery step may include a step of transmitting a beam discovery signal using a beam around the beam used immediately before the recovery step (S1990), selection of a reception beam of a receiving UE (S1991), V2X signal transmission of a transmitting UE (S1992), transmission/reception beam alignment based on HARQ feedback (S1993). In the recovery phase, the beam discovery signal may be transmitted periodically (e.g., in units of 160 ms) using M, which is the number of repetitions smaller than the number of repetitions N used in the discovery step (i.e., N>M, where N and M are natural numbers) (step S1990).

That is, in the recovery step, a beam discovery signal transmission operation is performed using only a limited number of neighboring beams using beam information immediately before the recovery step without using all available beams and data service resources related to the corresponding beams. Then, in the same way as in the discovery step, beam alignment is checked through HARQ feedback information. If the beam alignment is 1) normal, return to the V2X data service step. 2) If the beam alignment fails, it returns to the discovery step if the groupcast service needs to be continued. However, in this case, scheduling is performed so that there is no problem with the existing service vehicle or UE.

According to this method, when a problem occurs in a radio link during groupcast communication, resource efficiency increases because the radio link can be restored using relatively few resources.

For example, even after performing the recovery step, the transmitting UE monitors the HARQ feedback (S1994), continues the V2X service if the HARQ feedback is normal, and performs the discovery step if the HARQ feedback is not normal (that is, the discovery step of transmitting N (N>M) beam discovery signals is performed without repeating the recovery step).

Figure 20:
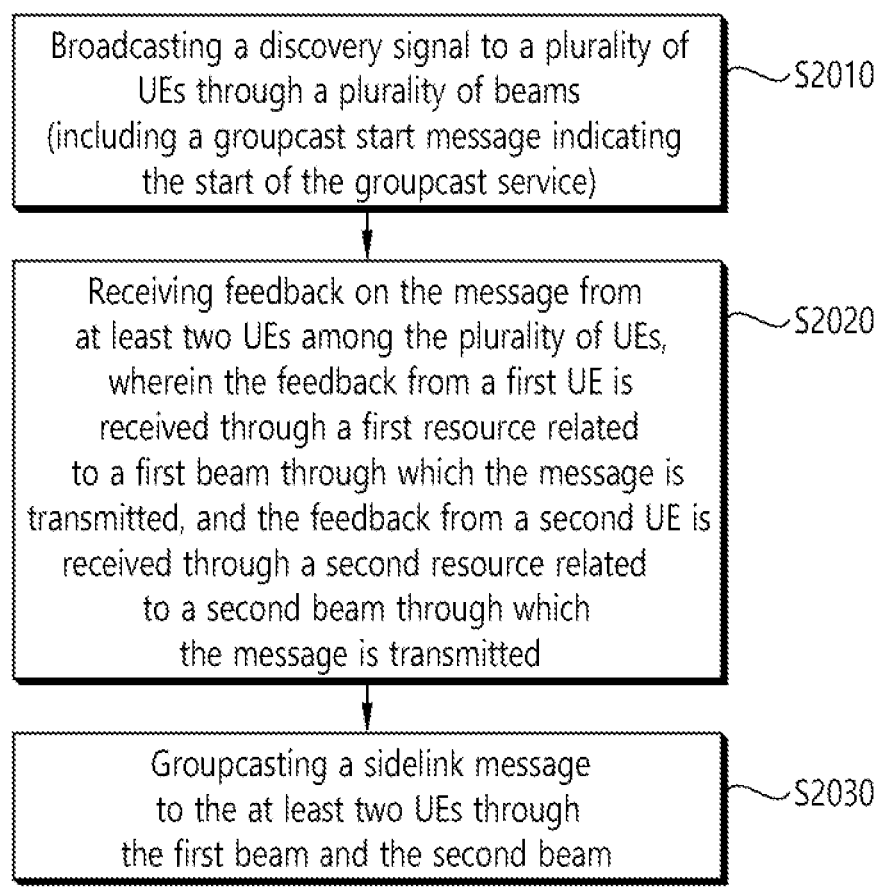
FIG. 20 is an example of a method of performing groupcast transmission in a wireless communication system.

FIG. 20 is an example of a method of performing groupcast transmission in a wireless communication system.

Referring to FIG. 20, a transmitting UE broadcasts a discovery signal to a plurality of UEs through a plurality of beams (S2010). For example, the transmitting UE transmits a discovery signal at time t1 using beam #1, transmits a discovery signal at time t1+160 ms using beam #2, . . . , and transmits a discovery signal at time t1+(160*(N-1)) ms using beam #N.

The discovery signal may include a message notifying the start of a groupcast service (groupcast start message). Alternatively, the groupcast start message and the discovery signal may be transmitted separately but together.

The transmitting UE receives feedback on the message from at least two UEs among the plurality of UEs (the two UEs are referred to as a first UE and a second UE for convenience). For example, feedback (e.g., HARQ feedback) from a first UE is received through a first resource related to a first beam through which the message is transmitted, and feedback (e.g., HARQ feedback) from a second UE is received through a second resource related to a second beam through which the message is transmitted (S2020).

For example, HARQ feedback resources (timing) for beam #1, HARQ feedback resources (timing) for beam #2, . . . , HARQ feedback resources (timing) for beam #N may be set to be distinguished from each other. In other words, HARQ feedback resources (timing) for each beam are associated, and this association may be configured or predetermined by a network or a transmission UE.

Based on HARQ feedback resources (timing), the transmitting UE can know whether the receiving UE has provided HARQ feedback for the groupcast start message transmitted through which beam. That is, the best transmission beam for the receiving UE can be known. In this sense, based on the timing of HARQ feedback, the transmitting UE can select the best transmission beam for the receiving UE.

The transmitting UE group-casts a sidelink message to the at least two UEs (first UE and second UE) through the first beam and the second beam (S2030).

Figure 21:
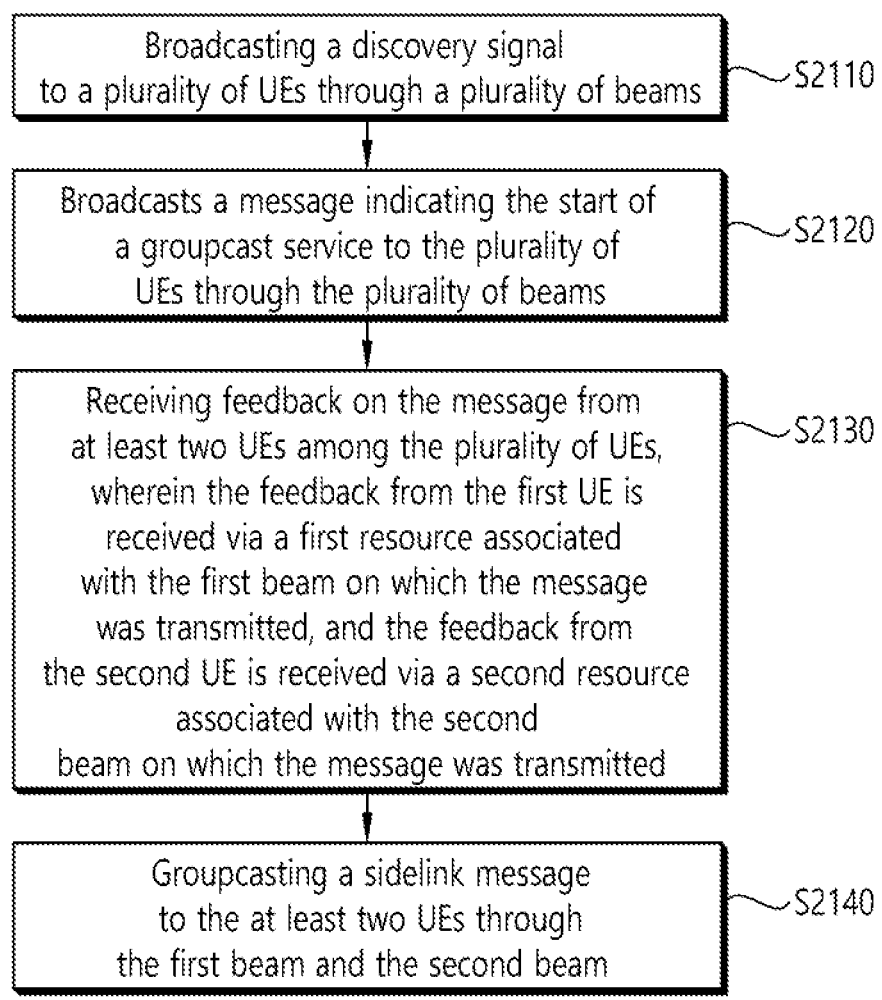
FIG. 21 is another example of a method of performing groupcast transmission in a wireless communication system.

FIG. 21 is another example of a method of performing groupcast transmission in a wireless communication system.

Referring to FIG. 21, a transmitting UE broadcasts a discovery signal to a plurality of UEs through a plurality of beams (S2110). For example, the transmitting UE may use beam #1 to transmit a discovery signal at time t1, beam #2 to transmit a discovery signal at time t1+160 ms, . . . , and beam #N to transmit a discovery signal at time t1+(160*(N-1))ms.

The transmitting UE broadcasts a message indicating the start of a groupcast service (groupcast start message) to the plurality of UEs through the plurality of beams (S2120).

The transmitting UE receives feedback on the message from at least two UEs among the plurality of UEs (the two UEs are referred to as a first UE and a second UE for convenience). For example, the feedback (e.g., HARQ feedback) from the first UE may be received via a first resource associated with the first beam on which the message was transmitted, and the feedback (e.g., HARQ feedback) from the second UE may be received via a second resource associated with the second beam on which the message was transmitted (S2130).

For example, the HARQ feedback resource (timing) for beam #1, HARQ feedback resource (timing) for beam #2, . . . , HARQ feedback resource (timing) for beam #N can be set distinct from each other. In other words, the HARQ feedback resource (timing) for each beam is associated, and this association can be configured or predetermined by the network or the transmitting UE.

Based on HARQ feedback resources (timing), the transmitting UE can know whether the receiving UE has provided HARQ feedback for the groupcast start message transmitted through which beam. That is, the best transmission beam for the receiving UE can be known. In this sense, based on the timing of HARQ feedback, the transmitting UE can select the best transmission beam for the receiving UE.

The transmitting UE group-casts a sidelink message to the at least two UEs (first UE and second UE) through the first beam and the second beam (S2140).

The transmitting UE may reserve radio resources (frequency/time) associated with the plurality of beams (e.g., it may reserve resources associated with the plurality of beams through broadcast system information or predetermined settings), and group-cast sidelink messages (V2X data) via the resources associated with the first beam and the second beam.

In FIGS. 20 and 21, after the feedback is completed, resources related to beams other than the first beam and the second beam among the plurality of beams may be removed from reserved resources.

In group-casting a sidelink message to the at least two UEs through the first beam and the second beam, the first beam and the second beam may be implicitly identified based on the first resource and the second resource. This has already been described in detail above.

In group-casting a sidelink message to the at least two UEs through the first beam and the second beam, the first beam and the second beam may be explicitly identified based on beam information included in the feedback from the first UE and the second UE. That is, as opposed to implicitly knowing the associated transmission beam based on the resources (timing) that the first UE and the second UE feedback, the feedback may include information that explicitly indicates the transmission beam, and the information may be used to explicitly know the transmission beam.

The discovery signal may be transmitted via a beam on which a sidelink synchronization signal block (SL-SSB) is transmitted.

The discovery signal may be transmitted at the same time point as the SL-SSB, or may be transmitted at a time point separated by an offset from the transmission time point of the SL-SSB. This has already been described above with reference to FIGS. 16 and 17.

The discovery signal may be transmitted through different beams that are transmitted N (N is a natural number greater than or equal to 2) times at regular intervals.

When there is no feedback for a predetermined time in the groupcasting step, the transmitting UE may transmit the discovery signal through beams transmitted M (M is a natural number smaller than N) times at regular intervals. This has already been described above with reference to FIG. 19.

Figure 22:
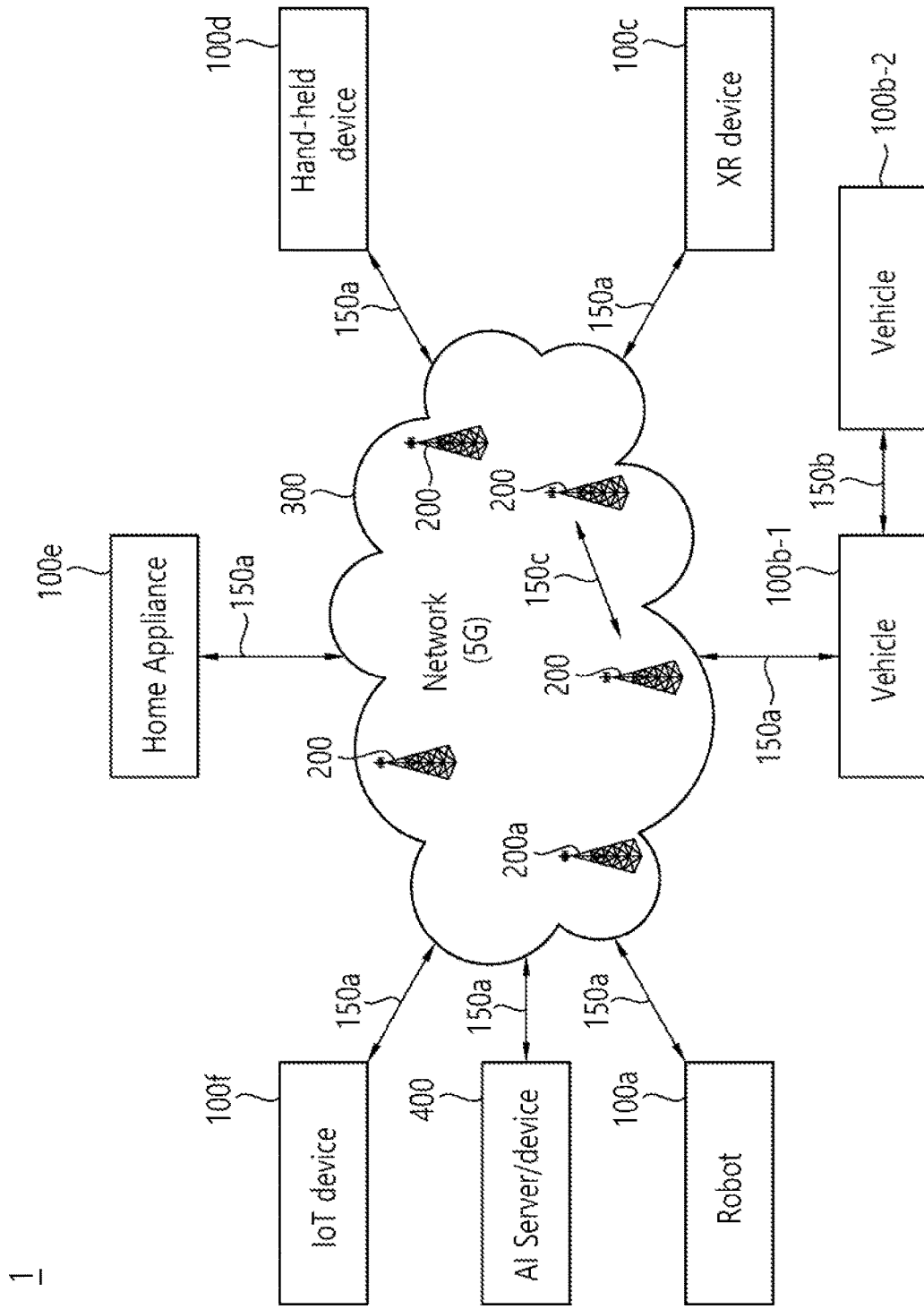
FIG. 22 illustrates a communication system 1 applied to this specification.

FIG. 22 illustrates a communication system 1 applied to this specification.

Referring to FIG. 22, a communication system 1 applied to the present specification includes a wireless device, a base station, and a network. The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, a base station and a network may also be implemented as a wireless device, and a specific wireless device 200a may operate as a base station/network node to other wireless devices.

Here, the wireless communication technology implemented in the wireless device of the present specification may include narrowband IoT (NB-IoT) for low-power communication as well as LTE, NR, and 6 G. For example, the NB-IoT technology may be an example of a LPWAN (Low Power Wide Area Network) technology, and may be implemented in standards such as LTE Cat NB1 and/or LTE Cat NB2, and is not limited to the above-mentioned name. Additionally or alternatively, the wireless communication technology implemented in the wireless device of the present specification may perform communication based on LTE-M technology. For example, the LTE-M technology may be an example of an LPWAN technology, and may be called by various names such as enhanced MTC (eMTC). For example, LTE-M technology may be implemented in at least one of various standards such as 1) LTE CAT 0, 2) LTE Cat M1, 3) LTE Cat M2, 4) LTE non-BL (Non-Bandwidth Limited), 5) LTE-MTC, 6) LTE MTC, and/or 7) LTE M, and is not limited to the above-described name. Additionally or alternatively, the wireless communication technology implemented in the wireless device of the present specification may include at least one of ZigBee, Bluetooth, and/or LPWAN in consideration of low-power communication, and it is not limited to the above-mentioned names. For example, the ZigBee technology may create PANs (Personal Area Networks) related to small/low-power digital communication based on various standards such as IEEE 802.15.4, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connection 150a, 150b, and 150c may be performed between the wireless devices 100a to 100f/base station 200 and the base station 200/base station 200. Here, wireless communication/connection refers to various wireless connections such as uplink/downlink communication 150a, sidelink communication 150b (or D2D communication), and inter-base station communication 150c (e.g. relay, Integrated Access Backhaul (IAB)). This can be done through technology (e.g. 5G NR). Through the wireless communication/connection 150a, 150b, and 150c, a wireless device and abase station/wireless device, and a base station and a base station may transmission/reception radio signals to each other. For example, the wireless communication/connections 150a, 150b, and 150c may transmission/reception signals through various physical channels. To this end, based on various proposals herein, at least some of the following may be performed: various configuration information setting processes for transmitting/receiving wireless signals, various signal processing processes (e.g., channel encoding/decoding, modulation/demodulation, resource mapping/demapping, etc.), resource allocation processes, etc.

The following describes examples of wireless devices to which this specification applies.

Figure 23:
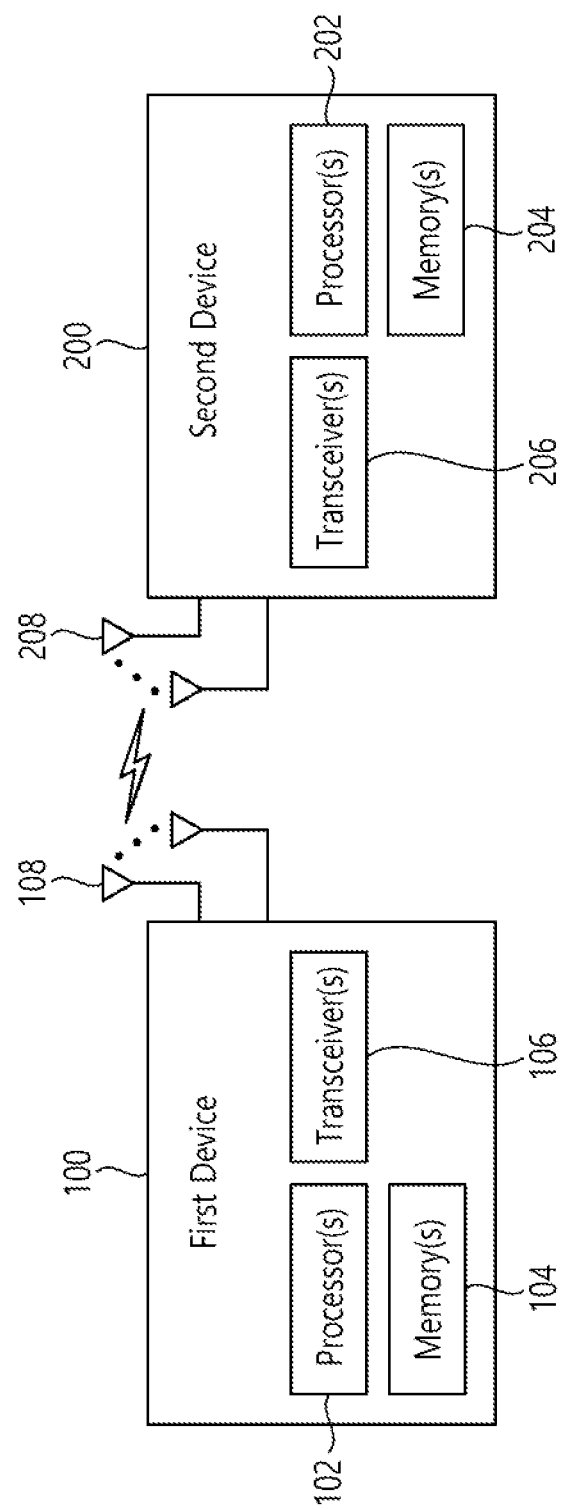
FIG. 23 illustrates a wireless device applicable to the present specification.

FIG. 23 illustrates a wireless device applicable to the present specification.

Referring to FIG. 23, the first wireless device 100 and the second wireless device 200 may transmit and receive radio signals through various radio access technologies (e.g., LTE, NR). Here, {the first wireless device 100, the second wireless device 200} is the {wireless device 100x, the base station 200} of FIG. 22 and/or the {wireless device 100x, the wireless device 100x} can correspond.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In this specification, the wireless device may refer to a communication modem/circuit/chip. The first wireless device may be, for example, a transmitting UE. A transmitting UE includes a transceiver, at least one memory, and at least one processor operably coupled with the at least one memory and the transceiver. The processor broadcasts a discovery signal to a plurality of UEs over a plurality of beams. The discovery signal includes a message informing of the start of a groupcast service. The processor receives feedback on the message from at least two UEs among the plurality of UEs. The feedback from the first UE is received through a first resource related to the first beam through which the message is transmitted, and the feedback from the second UE is received through a second resource related to the second beam through which the message is transmitted. And the processor performs an operation of group-casting a sidelink message to the at least two UEs through the first beam and the second beam.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In this specification, the wireless device may refer to a communication modem/circuit/chip. The second wireless device may be, for example, a receiving UE. The receiving UE includes a transceiver, at least one memory and at least one processor operably coupled with the at least one memory and the transceiver. The processor receives a discovery signal transmitted through a plurality of beams by a transmitting UE through a reception beam. The discovery signal includes a message notifying the start of a groupcast service. The processor transmits feedback on the message to the transmitting UE, and the feedback is transmitted through a first resource related to a first beam among the plurality of beams through which the message is transmitted. The processor receives a sidelink message, groupcast by the transmitting UE through the first beam, through the reception beam.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combination thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 24:
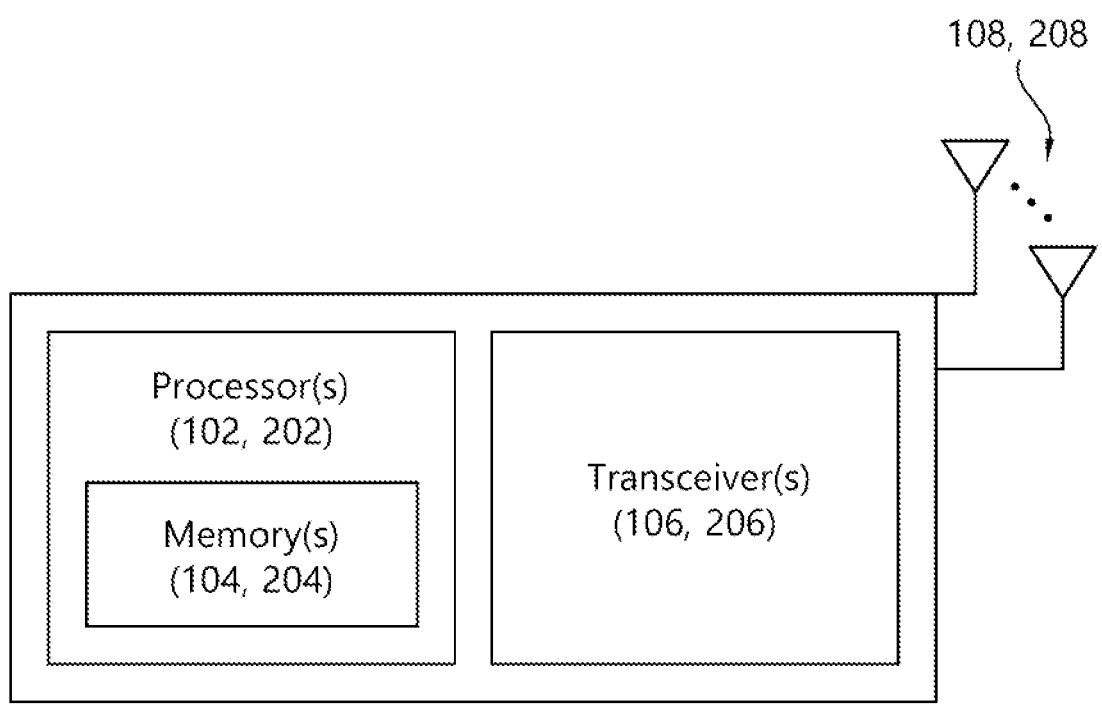
FIG. 24 shows another example of a wireless device applicable to the present specification.

FIG. 24 shows another example of a wireless device applicable to the present specification.

According to FIG. 24, a wireless device may include at least one processor 102, 202, at least one memory 104, 204, at least one transceiver 106, 206, and one or more antennas 108, 208.

The example of the wireless device described in FIG. 24 is different from the example of the wireless described in FIG. 23 in that the processors 102 and 202 and the memories 104 and 204 are separated in FIG. 23 whereas the memories 104 and 204 are included in the processors 102 and 202 in the example of FIG. 24.

Here, since the detailed description of the processors 102 and 202, the memories 104 and 204, the transceivers 106 and 206, and one or more antennas 108 and 208 have been described above, in order to avoid repetition of unnecessary description, repeated description is omitted.

The present disclosure may be performed by at least one computer readable medium (CRM) including instructions executed by at least one processor.

In the transmitting UE, the operations performed by the processor according to the instructions may include broadcasting a discovery signal to a plurality of UEs over a plurality of beams, where the discovery signal includes a message informing of the start of a groupcast service, receiving feedback on the message from at least two UEs among the plurality of UEs, where the feedback from the first UE is received through a first resource related to the first beam through which the message is transmitted, and the feedback from the second UE is received through a second resource related to the second beam through which the message is transmitted, and performing an operation of group-casting a sidelink message to the at least two UEs through the first beam and the second beam.

In the receiving UE, the operations performed by the processor according to the instructions may include receiving a discovery signal transmitted through a plurality of beams by a transmitting UE through a reception beam, where the discovery signal includes a message notifying the start of a groupcast service, transmitting feedback on the message to the transmitting UE, where the feedback is transmitted through a first resource related to a first beam among the plurality of beams through which the message is transmitted, and receiving a sidelink message, group-cast by the transmitting UE through the first beam, through the reception beam.

Figure 25:
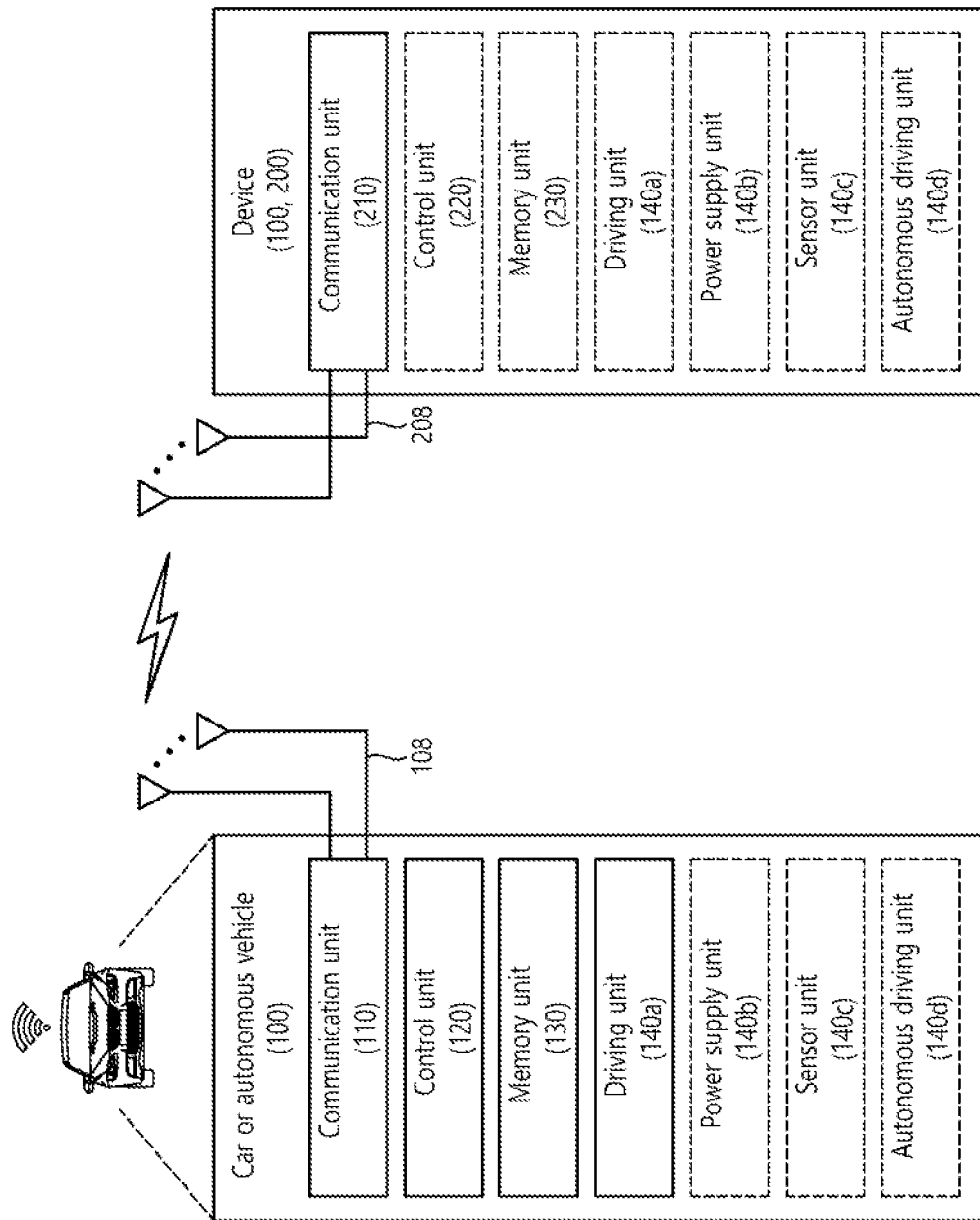
FIG. 25 illustrates a vehicle or autonomous vehicle according to an embodiment of the present disclosure.

FIG. 25 illustrates a vehicle or autonomous vehicle according to an embodiment of the present disclosure. Vehicles or autonomous vehicles may be implemented as mobile robots, vehicles, trains, manned/unmanned aerial vehicles (AVs), ships, and the like.

Referring to FIG. 25, a vehicle or autonomous vehicle 100 includes an antenna unit 108, a communication unit 110, a control unit 120, a driving unit 140a, a power supply unit 140b, a sensor unit 140c, and an autonomous driving unit 140d may be included. The antenna unit 108 may be configured as part of the communication unit 110. Blocks 110/130/140a to 140d correspond to blocks 110/130/140 of FIG. X3, respectively.

The communication unit 110 may transmission/reception signals (e.g., data, control signals, etc.) with external devices such as other vehicles, base stations (e.g. eNB, roadside base stations, etc.), servers, and the like. The controller 120 may perform various operations by controlling elements of the vehicle or autonomous vehicle 100. The controller 120 may include an Electronic Control Unit (ECU). The driving unit 140a may drive the vehicle or autonomous vehicle 100 on the ground. The driving unit 140a may include an engine, a motor, a power train, a wheel, a brake, a steering device, and the like. The power supply unit 140b supplies power to the vehicle or autonomous vehicle 100, and may include a wired/wireless charging circuit, a battery, and the like. The sensor unit 140c may obtain vehicle conditions, surrounding environment information, and user information. The sensor unit 140c may include an inertial measurement unit (IMU) sensor, a collision sensor, a wheel sensor, a speed sensor, an inclination sensor, a weight sensing sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a pedal position sensor, and the like. The autonomous driving unit 140d may implement techniques for maintaining the lane in which the vehicle is traveling, automatically adjusting speed, such as adaptive cruise control, automatically driving along a predetermined route, or automatically routing and driving once a destination is set.

In one example, the communication unit 110 may receive map data, traffic information data, and the like from an external server. The autonomous driving unit 140d may generate an autonomous driving route and a driving plan based on the obtained data. The control unit 120 may control the drive unit 140a (e.g., adjust speed/direction) to move the vehicle or autonomous vehicle 100 along the autonomous driving path according to the driving plan. During autonomous driving, the communication unit 110 obtains the latest traffic information data from an external server non-cyclically, and may obtain surrounding traffic information data from neighboring vehicles. In addition, during autonomous driving, the sensor unit 140c may acquire vehicle status and surrounding environment information. The autonomous driving unit 140d may update the autonomous driving route and the driving plan based on the newly acquired data/information. The communication unit 110 may transmit information about the vehicle location, autonomous driving route, driving plan, etc. to an external server. Based on the information collected from the vehicle or self-driving vehicle, the external server can predict traffic information data in advance using AI technology or the like, and provide the predicted traffic information data to the vehicle or self-driving vehicle.

Figure 26:
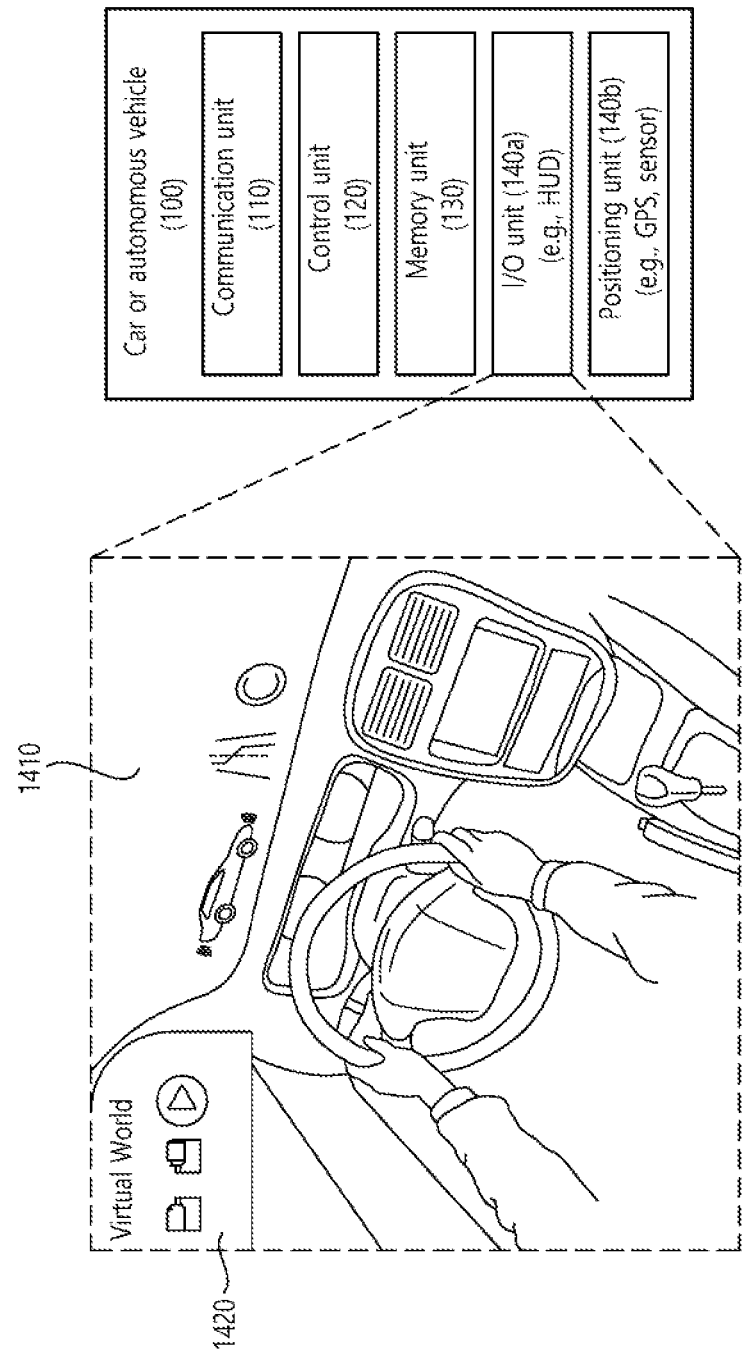
FIG. 26 illustrates a vehicle, according to an embodiment of the present disclosure.

FIG. 26 illustrates a vehicle, according to one embodiment of the present disclosure. The vehicle may be implemented as a transportation vehicle, train, airplane, ship, or the like.

Referring to FIG. 26, the vehicle 100 may include a communication unit 110, a control unit 120, a memory unit 130, an input/output unit 140a, and a position measurement unit 140b. Here, blocks 110~130/140a~140b correspond to blocks 110~130/140 of FIG. X3, respectively.

The communication unit 110 may transmit and receive signals (e.g., data, control signals, etc.) with other vehicles or external devices such as cell towers. The control unit 120 may control components of the vehicle 100 to perform various operations. Memory 130 may store data/parameters/programs/code/instructions that support various functions of the vehicle 100. The I/O unit 140a may output AR/VR objects based on the information in the memory unit 130. The I/O unit 140a may include a HUD. The position measurement unit 140b may obtain position information of the vehicle 100. The position information may include absolute position information of the vehicle 100, position information within a driving line, acceleration information, position information with respect to neighboring vehicles, and the like. The position measurement unit 140b may include GPS and various other sensors.

For example, the communication unit 110 of the vehicle 100 may receive map information, traffic information, and the like from an external server and store them in the memory unit 130. The location measurement unit 140b may acquire vehicle location information through GPS and various sensors and store it in the memory unit 130. The control unit 120 may generate a virtual object based on map information, traffic information, vehicle location information, etc., and the input/output unit 140a may display the created virtual object on a window in the vehicle (1410, 1420). In addition, the control unit 120 may determine whether the vehicle 100 is normally operated within the driving line based on the vehicle location information. When the vehicle 100 abnormally deviate from the driving line, the control unit 120 may display a warning on a window in the vehicle through the input/output unit 140a. In addition, the control unit 120 may broadcast a warning message about driving abnormality to surrounding vehicles through the communication unit 110. Depending on circumstances, the control unit 120 may transmit vehicle location information and information on driving/vehicle abnormalities to related agencies through the communication unit 110.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method of performing groupcast transmission in a wireless communication system, the method comprising:

broadcasting, by a user equipment (UE), a discovery signal to a plurality of user equipments (UEs) through a plurality of beams comprising a first beam and a second beam, wherein the plurality of beams are beams through which a sidelink synchronization signal block (SL-SSB) is transmitted, and wherein the discovery signal includes a message notifying a start of a groupcast service;

receiving, by the UE, feedback on the message from at least two UEs of the plurality of UEs, wherein the feedback from a first UE is received through a first resource related to the first beam through which the message is transmitted, and the feedback from a second UE is received through a second resource related to the second beam through which the message is transmitted; and groupcasting, by the UE, a sidelink message to the at least two UEs through the first beam and the second beam.

2. The method of claim 1, further comprising:
reserving resources related to the plurality of beams based on system information or a predetermined configuration.

3. The method of claim 1, wherein resources related to beams other than the first beam and the second beam among the plurality of beams are removed from reserved resources after the feedback is completed.

4. The method of claim 1, wherein in groupcasting the sidelink message to the at least two UEs through the first beam and the second beam, the first beam and the second beam are implicitly identified based on the first resource and the second resource.

5. The method of claim 1, wherein in groupcasting the sidelink message to the at least two UEs through the first beam and the second beam, the first beam and the second beam are explicitly identified based on beam information included in the feedback from the first UE and the second UE.

6. The method of claim 1, wherein the discovery signal is transmitted at a same time as the SL-SSB.

7. The method of claim 1, wherein the discovery signal is transmitted at a time point separated by an offset from a transmission time point of the SL-SSB.

8. The method of claim 1, wherein the discovery signal is transmitted through the plurality of beams that are transmitted N times (where N is a natural number greater than or equal to 2) at regular intervals.

9. The method of claim 1, wherein, when there is no feedback for a predetermined time in the groupcasting step, another discovery signal is transmitted through the plurality of beams transmitted M times (where M is a natural number smaller than N) at regular intervals.

10. An apparatus, comprising:
at least one transceiver;
at least one memory; and
at least one processor operably coupled with the at least one memory and the at least one transceiver,
wherein the at least one memory stores instructions that, based on being executed by the at least one processor, cause the at least one processor to perform operations comprising:
broadcasting a discovery signal to a plurality of user equipments (UEs) through a plurality of beams comprising a first beam and a second beam,
wherein the plurality of beams are beams through which a sidelink synchronization signal block (SL-SSB) is transmitted, and
wherein the discovery signal includes a message notifying a start of a groupcast service;
receiving feedback on the message from at least two UEs of the plurality of UEs,
wherein the feedback from a first UE is received through a first resource related to the first beam through which the message is transmitted, and the feedback from a second UE is received through a second resource related to the second beam through which the message is transmitted; and
groupcasting a sidelink message to the at least two UEs through the first beam and the second beam.

11. The apparatus of claim 10, further comprising:
reserving resources related to the plurality of beams based on system information or a predetermined configuration.

12. The apparatus of claim 10, wherein resources related to beams other than the first beam and the second beam among the plurality of beams are removed from reserved resources after the feedback is completed.

13. The apparatus of claim 10, wherein in groupcasting the sidelink message to the at least two UEs through the first beam and the second beam, the first beam and the second beam are implicitly identified based on the first resource and the second resource.

14. The apparatus of claim 10, wherein in groupcasting the sidelink message to the at least two UEs through the first beam and the second beam, the first beam and the second beam are explicitly identified based on beam information included in the feedback from the first UE and the second UE.

15. The apparatus of claim 10, wherein the discovery signal is transmitted at a same time as the SL-SSB.

16. The apparatus of claim 10, wherein the discovery signal is transmitted at a time point separated by an offset from a transmission time point of the SL-SSB.

17. The apparatus of claim 10, wherein the discovery signal is transmitted through the plurality of beams that are transmitted N times (where N is a natural number greater than or equal to 2) at regular intervals.

18. The apparatus of claim 10, wherein, when there is no feedback for a predetermined time in the groupcasting step, another discovery signal is transmitted through the plurality of beams transmitted M times (where M is a natural number smaller than N) at regular intervals.

* * * * *